United States Patent
Fujitomi et al.

(10) Patent No.: US 12,241,408 B2
(45) Date of Patent: Mar. 4, 2025

(54) PERFORMANCE EVALUATION METHOD, OPERATION CONTROL METHOD, PERFORMANCE EVALUATION DEVICE, AND PROGRAM

(71) Applicant: MITSUBISHI HEAVY INDUSTRIES, LTD., Tokyo (JP)

(72) Inventors: Yosuke Fujitomi, Yokohama (JP); Takashi Ichimaru, Yokohama (JP); Satoru Mori, Tokyo (JP); Toshihiko Niinomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 95 days.

(21) Appl. No.: 18/020,177

(22) PCT Filed: Sep. 13, 2021

(86) PCT No.: PCT/JP2021/033542
§ 371 (c)(1),
(2) Date: Feb. 7, 2023

(87) PCT Pub. No.: WO2022/075010
PCT Pub. Date: Apr. 14, 2022

(65) Prior Publication Data
US 2023/0287801 A1    Sep. 14, 2023

(30) Foreign Application Priority Data

Oct. 7, 2020   (JP) .................................. 2020-169638

(51) Int. Cl.
*F02C 6/18*     (2006.01)
*F01K 23/10*    (2006.01)
*F02C 6/00*     (2006.01)

(52) U.S. Cl.
CPC .................. *F02C 6/18* (2013.01); *F02C 6/00* (2013.01); *F01K 23/10* (2013.01)

(58) Field of Classification Search
CPC ............... F02C 6/00; F02C 6/18; F01K 23/10
See application file for complete search history.

(56) References Cited

U.S. PATENT DOCUMENTS

| | | | |
|---|---|---|---|
| 4,455,614 A * | 6/1984 | Martz | F01K 23/10 290/40 R |
| 4,696,052 A * | 9/1987 | Breeden | H04H 20/67 455/503 |

(Continued)

FOREIGN PATENT DOCUMENTS

| | | |
|---|---|---|
| JP | 6-25930 | 4/1994 |
| JP | 11-81920 | 3/1999 |

(Continued)

OTHER PUBLICATIONS

International Search Report issued Oct. 26, 2021 in International (PCT) Application No. PCT/JP2021/033542, with English-language translation.

(Continued)

*Primary Examiner* — William H Rodriguez
(74) *Attorney, Agent, or Firm* — Wenderoth, Lind & Ponack, L.L.P.

(57) ABSTRACT

This performance evaluation device comprises: an acquisition unit which acquires a sampling value of a gas turbine output and a sampling value of a steam turbine output, measured at each time during the operation of a combined cycle power generation plant that generates power using the gas turbine and the steam turbine; and an output calculation unit which obtains a plant output that is a total output of the sampling value of the gas turbine output measured at a first time and the sampling value of the steam turbine that is the steam turbine output corresponding to the gas turbine output (Continued)

at the first time and is measured at a second time after a predetermined delay from the first time.

14 Claims, 11 Drawing Sheets

(56) References Cited

U.S. PATENT DOCUMENTS

| | | | |
|---|---|---|---|
| 4,755,925 | A | 7/1988 | Tsuchiya et al. |
| 2001/0034582 | A1 | 10/2001 | Umezawa et al. |
| 2004/0086068 | A1* | 5/2004 | Lin .................... H04L 5/02 375/355 |
| 2010/0213883 | A1* | 8/2010 | Horng ................ H02P 6/085 318/400.14 |
| 2014/0060065 | A1 | 3/2014 | Sweet et al. |
| 2018/0010526 | A1* | 1/2018 | Mori .................. H02K 7/1823 |
| 2018/0017031 | A1* | 1/2018 | Matsushiro ........... F01D 19/00 |
| 2018/0058321 | A1* | 3/2018 | Yokoyama ............. F02C 3/04 |
| 2019/0024529 | A1* | 1/2019 | Kajihara ............... F02C 9/00 |
| 2020/0149471 | A1 | 5/2020 | Tsukuda et al. |
| 2023/0247517 | A1* | 8/2023 | Shibata ............. H04W 88/08 370/328 |

FOREIGN PATENT DOCUMENTS

| | | |
|---|---|---|
| JP | 2001-263006 | 9/2001 |
| JP | 2020-79564 | 5/2020 |

OTHER PUBLICATIONS

Written Opinion of the International Searching Authority issued Oct. 26, 2021 in International (PCT) Application No. PCT/JP2021/033542, with English-language translation.

* cited by examiner

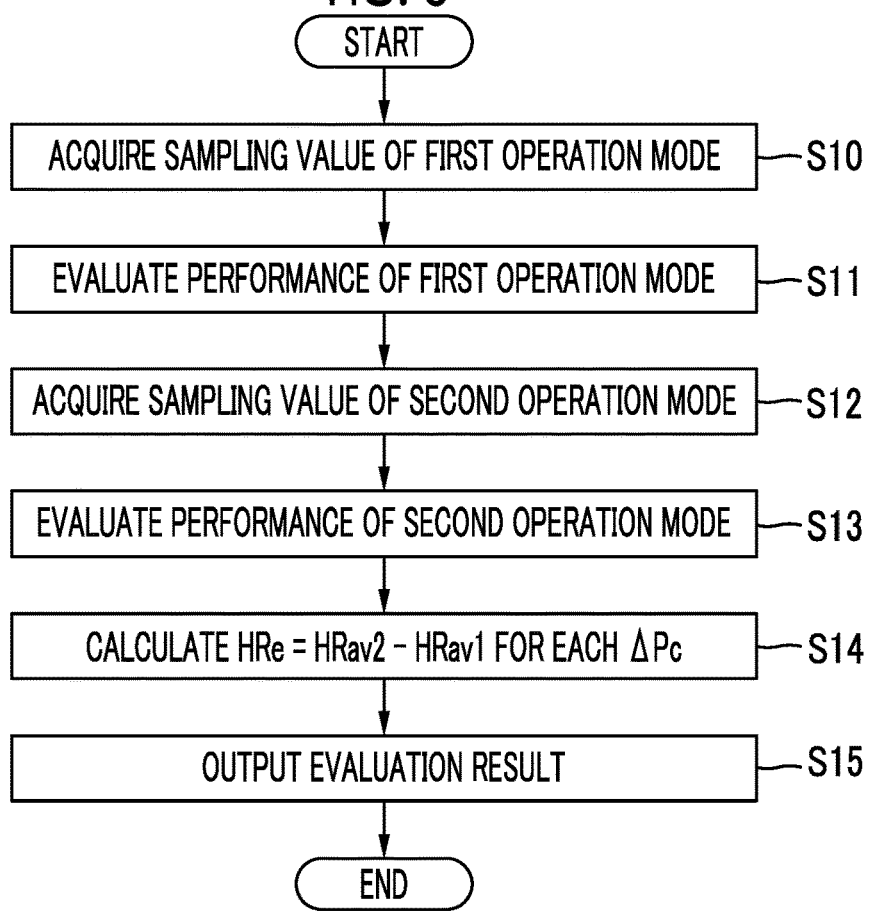
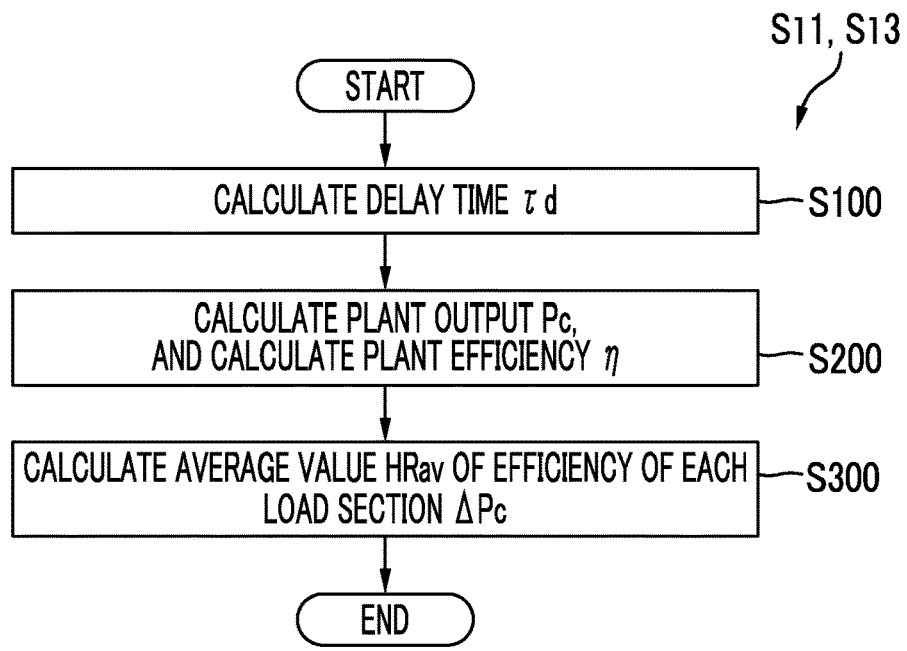

PERFORMANCE EVALUATION METHOD, OPERATION CONTROL METHOD, PERFORMANCE EVALUATION DEVICE, AND PROGRAM

TECHNICAL FIELD

The present disclosure relates to a performance evaluation method, an operation control method, a performance evaluation device, and a program.

Priority is claimed on Japanese Patent Application No. 2020-169638, filed on Oct. 7, 2020, the content of which is incorporated herein by reference.

BACKGROUND ART

As a technique for diagnosing a power generation plant, for example, it is conceivable to adopt a technique for diagnosing whether or not an abnormality is present by comparing a state quantity calculated by a plant diagnosis model with a state quantity acquired from the power generation plant (for example, refer to PTL 1).

In addition, in some cases, a diagnosis (performance evaluation) may be performed to confirm an improved performance degree when a periodic inspection is performed on the power generation plant or when an operation condition (control logic) is changed. In the power generation plant, a load varies from moment to moment depending on a power demand. In this case, data measured in the power generation plant during a commercial operation greatly fluctuates. Consequently, it is difficult to perform a performance evaluation on the power generation plant by using the data. Therefore, according to the technique disclosed in the related art, it is necessary to temporarily stop the commercial operation, perform a test operation by stabilizing a gas turbine of the power generation plant (maintaining a constant load), and measure the data for the performance evaluation.

CITATION LIST

Patent Literature

[PTL 1] Japanese Examined Patent Application Publication No. 6-25930

SUMMARY OF INVENTION

Technical Problem

However, generated power cannot be sold during the test operation, and costs for the test operation are high. Therefore, it is desirable to perform the performance evaluation on the power generation plant by using the data measured during the commercial operation.

The present disclosure is made in view of this problem, and provides a performance evaluation method, an operation control method, a performance evaluation device, and a program which can evaluate plant performance, based on data measured during an operation.

Solution to Problem

According to an aspect of the present disclosure, there is provided a performance evaluation method including a step of acquiring a sampling value of a gas turbine output and a sampling value of a steam turbine output which are measured at each time during an operation of a combined cycle power generation plant that generates power by using a gas turbine and a steam turbine, and a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

According to another aspect of the present disclosure, there is provided a performance evaluation device including an acquisition unit that acquires a sampling value of a gas turbine output and a sampling value of a steam turbine output which are measured at each time during an operation of a combined cycle power generation plant that generates power by using a gas turbine and a steam turbine, and an output calculation unit that obtains a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

According to still another aspect of the present disclosure, there is provided a program that causes a computer of a performance evaluation device to execute steps including a step of acquiring a sampling value of a gas turbine output and a sampling value of a steam turbine output which are measured at each time during an operation of a combined cycle power generation plant that generates power by using a gas turbine and a steam turbine, and a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

Advantageous Effects of Invention

According to the performance evaluation method, the operation control method, the performance evaluation device, and the program in the present disclosure, plant performance can be evaluated, based on data measured during an operation.

BRIEF DESCRIPTION OF DRAWINGS

FIG. 3 is a first flowchart illustrating a process example of a performance evaluation device according to the first embodiment of the present disclosure.

FIG. 4 is a second flowchart illustrating a process example of the performance evaluation device according to the first embodiment of the present disclosure.

DESCRIPTION OF EMBODIMENTS

First Embodiment

Hereinafter, a performance evaluation system 1 according to a first embodiment of the present disclosure will be described with reference to FIGS. 1 to 13.
(Overall Configuration)

Figure 1:
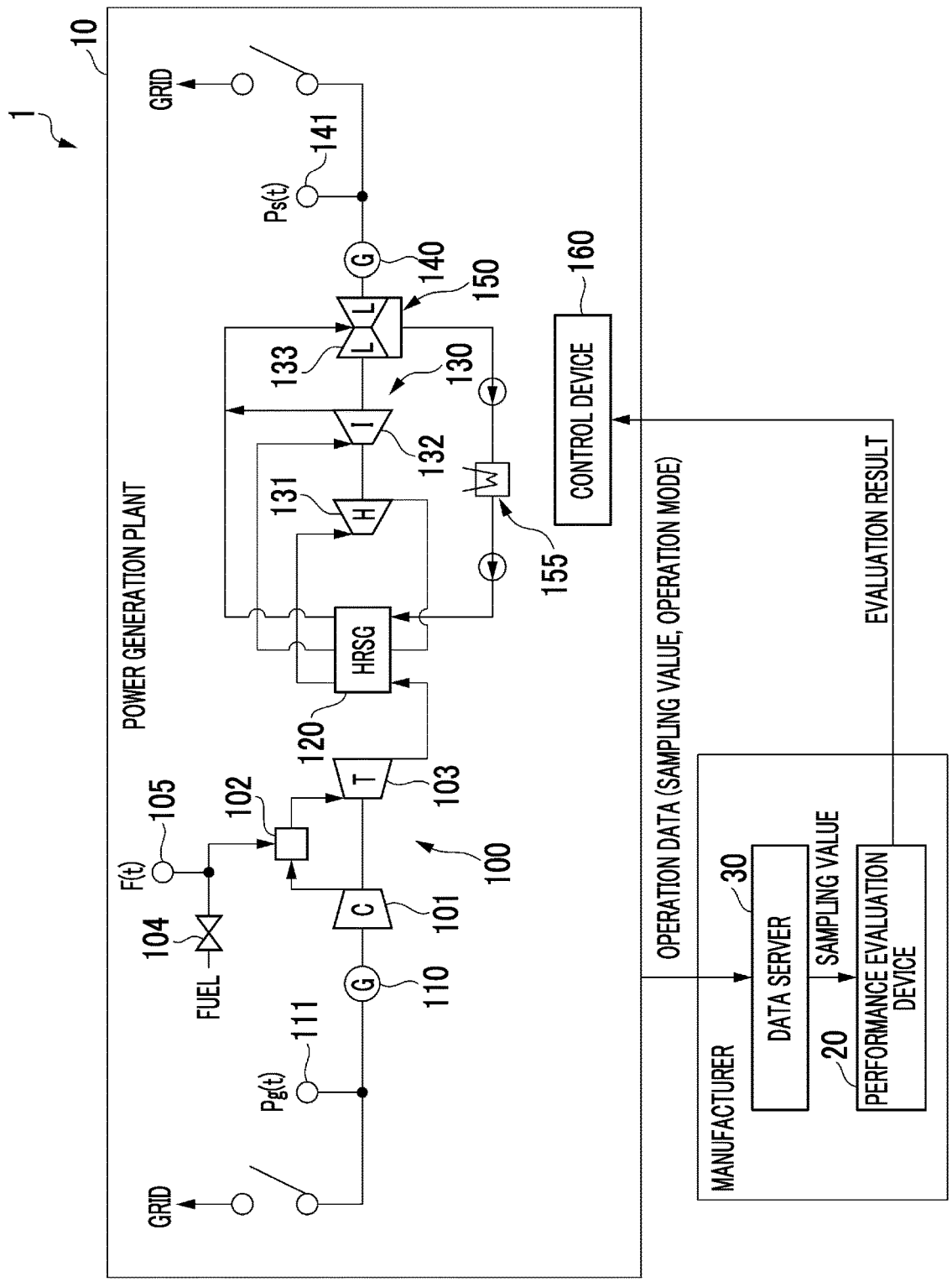
FIG. 1 is a view illustrating an overall configuration of a performance evaluation system according to a first embodiment of the present disclosure.

FIG. 1 is a view illustrating an overall configuration of the performance evaluation system according to the first embodiment of the present disclosure.

The performance evaluation system 1 is a system for evaluating performance of a combined cycle power generation plant 10 (hereinafter, also referred to as a "power generation plant 10"). As illustrated in FIG. 1, the performance evaluation system 1 includes a power generation plant 10 and a performance evaluation device 20.
(Configuration of Power Generation Plant)

As illustrated in FIG. 1, the power generation plant 10 includes a gas turbine 100, a generator 110 that generates power by driving the gas turbine 100, a heat recovery steam generator 120 that generates steam by using heat of exhaust gas exhausted from the gas turbine 100, a steam turbine 130 (high-pressure steam turbine 131, medium-pressure steam turbine 132, and low-pressure steam turbine 133) driven by the steam from the heat recovery steam generator 120, a generator 140 that generates power by driving the steam turbine 130 (131, 132, and 133), a condenser 150 that converts the steam exhausted from the low-pressure steam turbine 133 back to water, a water supply heater 155, and a control device 160 that controls each of these devices.

The gas turbine 100 includes a compressor 101 that compresses external air to generate compressed air, a combustor 102 that mixes and combusts the compressed air with a fuel gas to generate a high-temperature combustion gas, a turbine 103 driven by the combustion gas, and a fuel flow rate regulation valve 104 that regulates a fuel flow rate to be supplied to the combustor 102. A fuel line that supplies a fuel from a fuel supply source to the combustor 102 is connected to the combustor 102. The fuel flow rate regulation valve 104 is provided in the fuel line. An exhaust port of the turbine 103 is connected to the heat recovery steam generator 120. Furthermore, a flow meter 105 is provided in the fuel line, and a fuel flow rate F supplied to the combustor 102 is sequentially measured.

High-pressure steam generated by the heat recovery steam generator 120 is supplied to the high-pressure steam turbine 131 via a steam line. Medium-pressure steam obtained by reheating the steam exhausted from the high-pressure turbine 131 by the heat recovery steam generator 120 is supplied to the medium-pressure steam turbine 132 via a steam line. Low-pressure steam generated by the heat recovery steam generator 120 and the steam exhausted from the medium-pressure steam turbine 132 are supplied to the low-pressure steam turbine 133 via a steam line.

The condenser 150 is connected to an outlet of the low-pressure steam turbine 133. The steam exhausted from the low-pressure steam turbine 133 is converted back to the water by the condenser 150, and is further fed to the heat recovery steam generator 120 through the water supply heater 155 via a supply water line.

The control device 160 performs output control of the gas turbine 100 and output control of the steam turbine 130, and generates the power via the generators 110 and 140.

The power generated by the generators 110 and 140 can be supplied to a grid (power system) via each power path. In addition, output meters 111 and 141 are provided in each power path. The power generated by the generator 110 driven by the gas turbine 100 (hereinafter, also referred to as a "gas turbine output Pg") and the power generated by the generator 140 driven by the steam turbine 130 (hereinafter, also referred to as a "steam turbine output Ps") are sequentially measured.
(Functional Configuration of Performance Evaluation Device)

Figure 2:
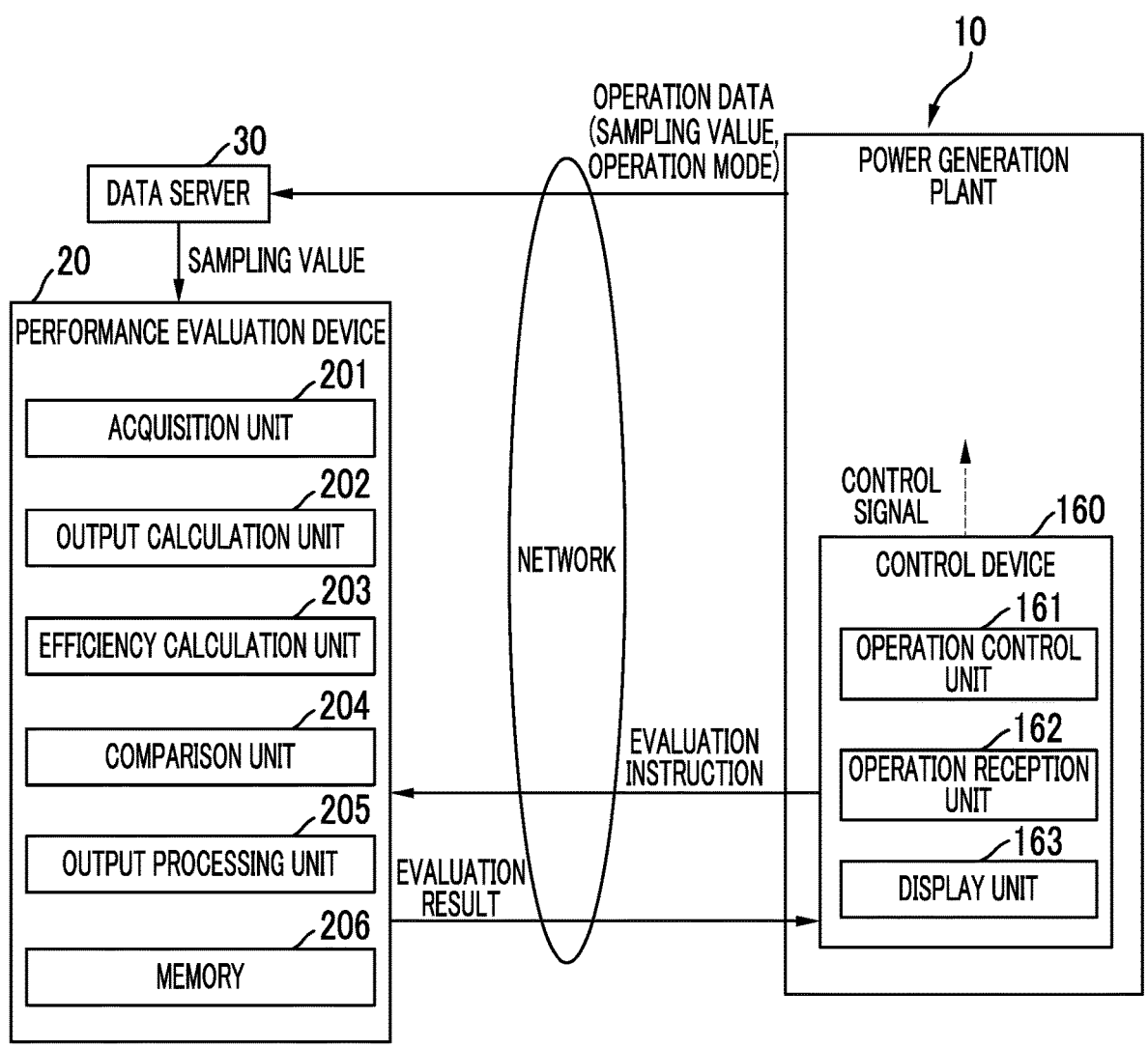
FIG. 2 is a view illustrating a functional configuration of the performance evaluation system according to the first embodiment of the present disclosure.

FIG. 2 is a view illustrating a functional configuration of the performance evaluation system according to the first embodiment of the present disclosure.

The performance evaluation device 20 evaluates the performance of the power generation plant 10, based on operation data of the power generation plant 10.

The operation data is data including a sampling value (fuel flow rate F, gas turbine output Pg, and steam turbine output Ps) measured in the power generation plant 10 during a commercial operation, an operation mode of the power generation plant 10, and a measurement time of the sampling value. The operation mode represents a specific operation state of the power generation plant 10, and a plurality of the operation modes are defined according to an operation condition (control logic) and a status of performing a periodic inspection (before or after performance). The operation data of the power generation plant 10 is collected at a predetermined sampling time (for example, one minute), is transmitted to a data server 30 via a network such as the Internet, and is accumulated. In an aspect, the operation data may be temporarily accumulated in a memory (not illustrated) of the power generation plant 10, may be packetized at a predetermined time, and may be transmitted to the data server 30. For example, the predetermined time may be after a lapse of a prescribed time (for example, one hour) from previous transmission, or may be when a prescribed number of data points (for example, 1,000 points) is accumulated in the memory.

The performance evaluation device 20 acquires the sampling values accumulated in the data server 30, and evaluates the performance of the power generation plant 10. FIG. 1 illustrates an example in which the performance evaluation device 20 and the data server 30 are managed and operated by a manufacturer (manufacturing, maintaining, or evaluating company) of the power generation plant 10. The present disclosure is not limited to this aspect. In other embodiments, the data server 30 may be a data server provided by a cloud computing service provider.

As illustrated in FIG. 2, the performance evaluation device 20 includes an acquisition unit 201, an output calculation unit 202, an efficiency calculation unit 203, a comparison unit 204, an output processing unit 205, and a memory 206.

The acquisition unit 201 acquires the sampling value (fuel flow rate F, gas turbine output Pg, and steam turbine output Ps) measured at each time during the operation of the power generation plant 10.

The output calculation unit 202 obtains a plant output Pc which is a total output of the sampling value of the gas turbine output Pg measured at a first time and the sampling value of the steam turbine output Ps corresponding to the gas turbine output Pg measured at the first time, the steam turbine output Ps measured at a second time after a predetermined delay time from the first time.

The efficiency calculation unit 203 obtains efficiency of the power generation plant 10, based on the plant output Pc and the fuel flow rate F.

The comparison unit 204 compares average efficiency of each section of the plant output Pc in a first operation mode of the power generation plant 10 and average efficiency of each section of the plant output Pc in a second operation mode different from the first operation mode with each other. For example, the section of the plant output Pc is obtained by dividing the plant output into a predetermined range ΔPc (for example, 10 MW) such as a section of "0 to 9 MW", a section of "10 to 19 MW", and so forth.

For example, the first operation mode is an operation mode before the periodic inspection of the power generation plant 10, and the second operation mode is an operation mode after the periodic inspection. The power generation plant 10 can manually or automatically switch a plurality of operation conditions (control logic) through the control device 160. Therefore, the first operation mode may be an operation mode under one operation condition in the plurality of operation conditions, and the second operation mode may be an operation mode under another operation condition.

The output processing unit 205 transmits an evaluation result of the power generation plant 10 to the control device 160 of the power generation plant 10. The evaluation result includes the plant output Pc calculated by the output calculation unit 202, the plant efficiency calculated by the efficiency calculation unit 203, and a comparison result of the comparison unit 204. In addition, the output processing unit 205 may output an evaluation result to a display connected to the performance evaluation device.

The memory 206 is a so-called auxiliary storage device, and may be a hard disk drive (HDD) or a solid state drive (SSD), for example. The sampling value acquired by the acquisition unit 201 and a calculation result by the output calculation unit 202 and the efficiency calculation unit 203 are stored in the memory 206.

(Functional Configuration of Control Device)

As illustrated in FIG. 2, the control device 160 has an operation control unit 161, an operation reception unit 162, and a display unit 163.

The operation control unit 161 automatically controls each device of the power generation plant 10 in accordance with a state of the power generation plant 10. In addition, an operator who monitors the power generation plant 10 may perform a manual operation via an operation reception unit 162 (to be described later). In this case, the operation control unit 161 controls each device of the power generation plant 10, based on an operation received from the operator.

In addition, the operation control unit 161 according to the present embodiment performs switching control on the operation modes of the power generation plant 10, based on an evaluation result received from the performance evaluation device 20. For example, when the evaluation result shows that the second operation mode is more efficient than the first operation mode in a section of a certain plant output, and when the current plant output of the power generation plant 10 is included in this section, the operation control unit 161 automatically switches the operation mode of the power generation plant 10 from the first operation mode to the second operation mode.

The operation reception unit 162 receives an operation of the operator who monitors the power generation plant 10. For example, the operation reception unit 162 receives the switching operation of the operation modes of the power generation plant 10. In this case, the operation reception unit 162 causes the operation control unit 161 to perform control relating to the switching of the operation modes. In addition, the operation reception unit 162 may instruct the performance evaluation device 20 to evaluate the performance of the power generation plant 10 before and after the operation modes are switched.

In addition, the operation reception unit 162 receives a start operation of the performance evaluation of the power generation plant 10. For example, when the operator performs the start operation of the performance evaluation after the periodic inspection is completed, the operation reception unit 162 instructs the performance evaluation device 20 to evaluate the performance of the power generation plant 10 before and after the periodic inspection is performed.

The display unit 163 is a display that displays the sampling value of the power generation plant 10 and the evaluation result received from the performance evaluation device 20. The operator refers to the evaluation result displayed on the display unit 163, and performs the switching operation of the operation modes via the operation reception unit 162.

(Process Flow of Performance Evaluation System)

FIG. 3 is a first flowchart illustrating a process example of the performance evaluation device according to the first embodiment of the present disclosure.

Here, an example will be described in which the performance is evaluated in an evaluation period during which the first operation mode is switched to the second operation mode by the manual operation of the operator, and before the switching (first operation mode), and an evaluation period after the switching (second operation mode). The evaluation period is set to a prescribed time period of n minutes (for example, 60 minutes) before and after the switching. Here, the performance evaluation device 20 performs each of the following processes after operation data obtained for a predetermined number of minutes including the n minutes before and after switching the operation modes is accumulated in the data server 30. The predetermined number is set by the number of data (for example, 1,000 points) and a data acquisition period (for example, three to four hours).

As illustrated in FIG. 3, the acquisition unit 201 of the performance evaluation device 20 first acquires the sampling value before switching the operation mode (first operation mode) from the data server 30 (Step S10).

Next, the output calculation unit 202 and the efficiency calculation unit 203 of the performance evaluation device 20 evaluate the performance of the first operation mode of the power generation plant 10 (Step S11).

FIG. 4 is a second flowchart illustrating a process example of the performance evaluation device according to the first embodiment of the present disclosure.

As illustrated in FIG. 4, the output calculation unit 202 first calculates a delay time td of the steam turbine output Ps in the first operation mode (Step S100).

Figure 5:
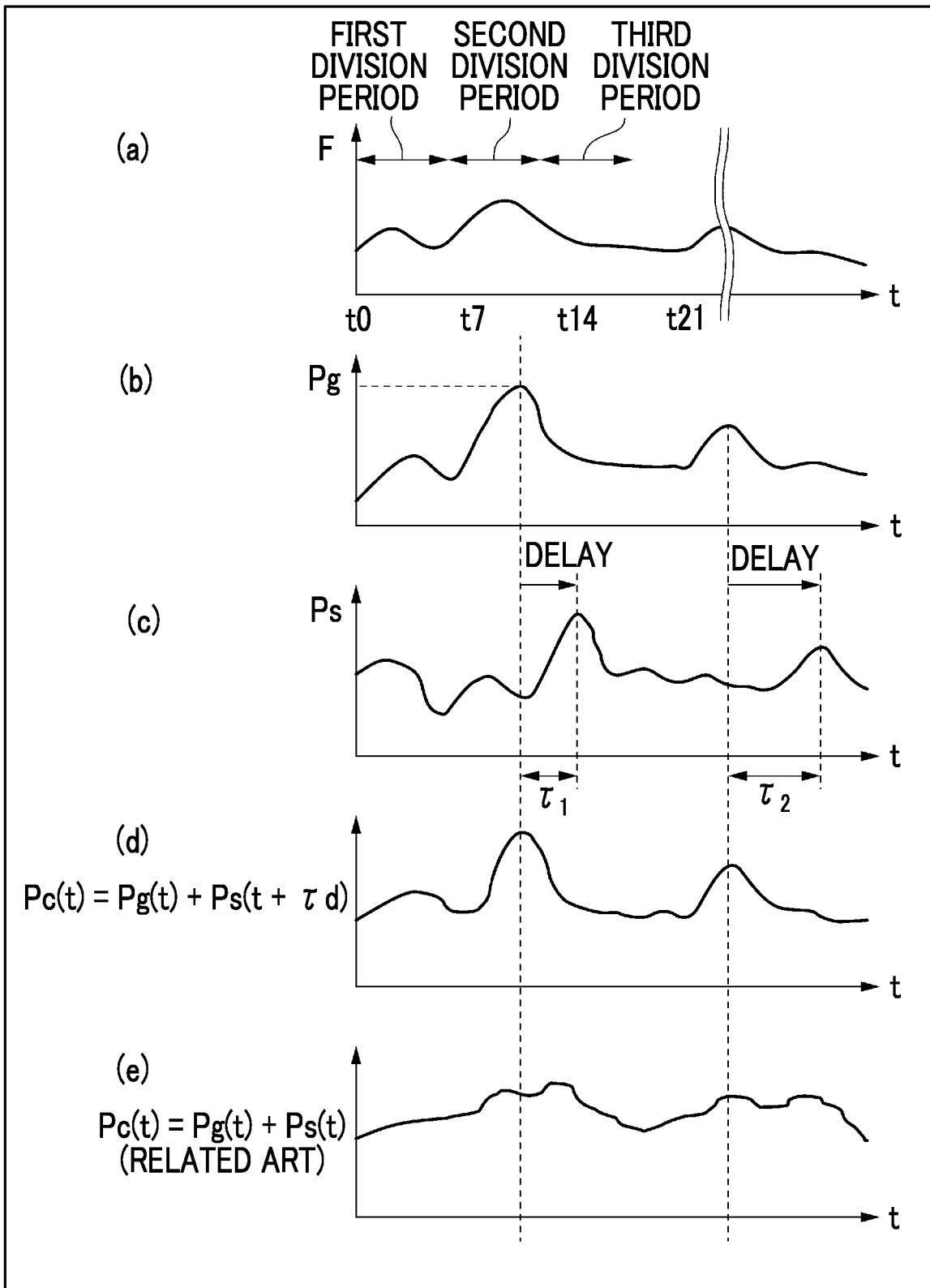
FIG. 5 is a view illustrating an example of a sampling value and a plant output according to the first embodiment of the present disclosure.

FIG. 5 is a view illustrating an example of the sampling value and the plant output according to the first embodiment of the present disclosure.

FIG. 5(a) is a graph illustrating the fuel flow rate F, FIG. 5(b) is a graph illustrating the gas turbine output Pg, and FIG. 5(c) is a graph illustrating a time series of the steam turbine output Ps. In addition, FIG. 5(d) is a graph illustrating a time series of the plant output Pc calculated by the output calculation unit 202 according to the present embodiment, FIG. 5(e) is a graph illustrating a time series of the plant output Pc calculated by using a method in the related art as a comparison.

In the power generation plant 10, outputs of the gas turbine 100 and the steam turbine 130 fluctuate depending on a control command of the control device 160. At this time, the steam turbine is driven by the steam generated by using the exhaust gas of the gas turbine 100. Therefore, as illustrated in FIGS. 5(b) and 5(c), output fluctuations of the steam turbine 130 are generated later than output fluctuations of the gas turbine 100.

Therefore, as in a method in the related art illustrated in FIG. 5(e), when the plant output Pc is calculated by summing up the gas turbine output Pg(t) and the steam turbine output Ps(t) at the same time t, it is difficult to correctly evaluate the performance of the power generation plant 10. Based on this information, as illustrated in FIG. 5(d), the output calculation unit 202 according to the present embodiment obtains the plant output Pc in view of a delay time t of the steam turbine output Ps with respect to the gas turbine output Pg. Hereinafter, a method in which the output calculation unit 202 according to the present embodiment obtains the plant output Pc in view of the delay time t of the steam turbine output Ps will be described in detail.

Figure 6:
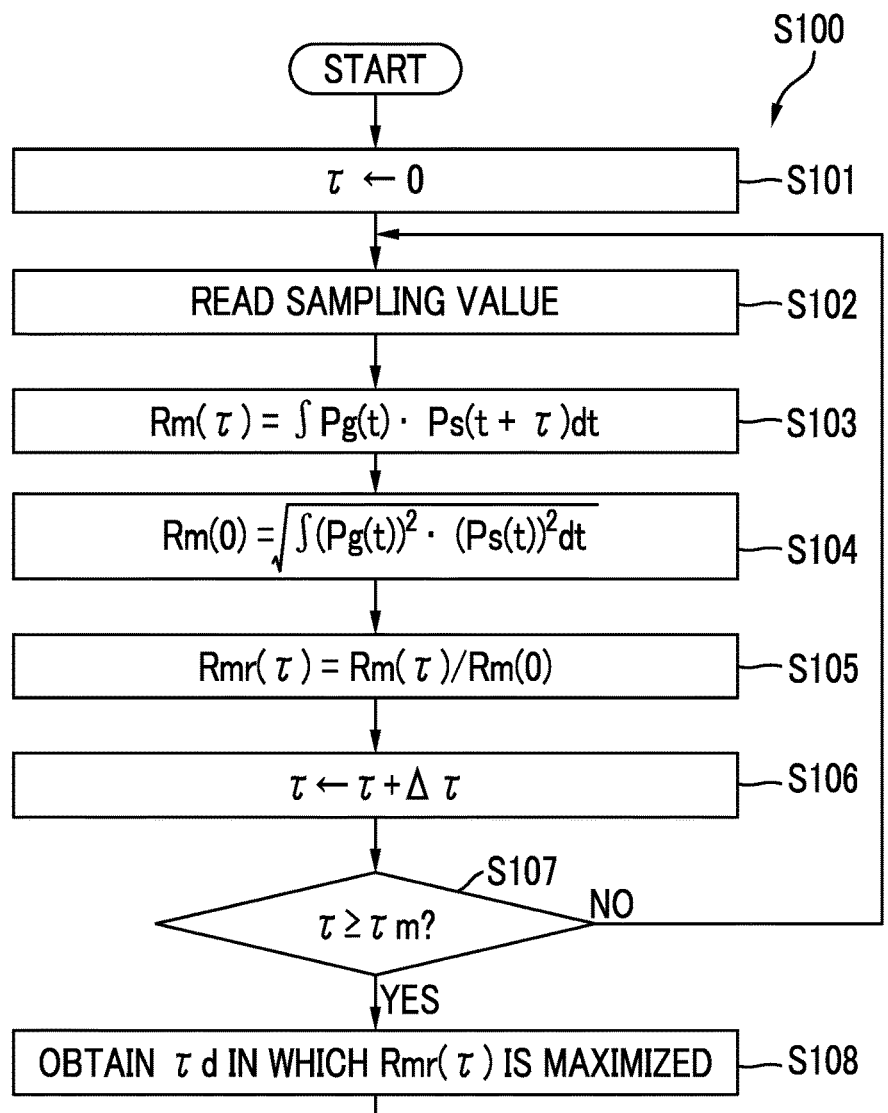
FIG. 6 is a third flowchart illustrating a process example of the performance evaluation device according to the first embodiment of the present disclosure.

FIG. 6 is a third flowchart illustrating a process example of the performance evaluation device according to the first embodiment of the present disclosure.

First, with reference to FIG. 6, a process in which the output calculation unit 202 calculates a fixed value td of a delay time (hereinafter, also simply referred to as a "delay time τd") will be described in detail. The output calculation unit 202 according to the present embodiment obtains the delay time τd for each division period in which an evaluation period (t0 to tn) of the first operation mode is further divided into a prescribed time period (for example, seven minutes). Here, only an example in which the output calculation unit 202 obtains the delay time τd in the first division period (time t0 to t7) in a plurality of division periods will be described. The output calculation unit performs the same process for a second division period, a third division period, and so forth, and obtains delay times τd1, τd2, τd3, and so forth for each division time.

First, the output calculation unit 202 initializes the delay time τ (Step S101).

Next, the output calculation unit 202 reads the sampling values of the gas turbine output Pg and the steam turbine output Ps during the evaluation period of the first operation mode (Step S102). In addition, a time within the evaluation period is defined as times t0 to tn.

Next, the output calculation unit 202 obtains a cross-correlation function between the gas turbine output Pg and the steam turbine output Ps when the delay time of the steam turbine output is "τ" (Step S103). Here, the cross-correlation function between the gas turbine output Pg(t) at a time τ and the steam turbine output Ps(t+τ) after the delay time τ is expressed by Equation (1).

[Equation 1]

$$Rm(\tau)=\int Pg(t)\cdot Ps(t+\tau)dt \quad (1)$$

In addition, the output calculation unit 202 obtains Rmr(τ) obtained in such a manner that Rm(τ) is normalized by using Equations (2) and (3) (Steps S104 and S105).

[Equation 2]

$$Rm(0)=\sqrt{\int (Pg(t))^2 \cdot (Ps(t))^2 dt} \quad (2)$$

[Equation 3]

$$Rmr(\tau)=Rm(\tau)/Rm(0) \quad (3)$$

Next, the output calculation unit 202 increases the delay time τ by a prescribed time period Δτ (Step S106). For example, the prescribed time period Δτ is one minute.

Next, the output calculation unit 202 determines whether the cross-correlation function is obtained for all of the delay times τ (τ0 to τ7) from an initial value (zero minutes) to an upper limit value m (for example, seven minutes) (Step S107). The upper limit value m of the delay time may be changed depending on the performance of the gas turbine 100 and the steam turbine 130. When the cross-correlation function is not obtained for all of the delay times τ (Step S107: NO), the output calculation unit 202 returns to Step S102, and performs a process of obtaining the cross-correlation function for the subsequent delay time τ. On the other hand, when the cross-correlation function is obtained for all of the delay times τ (Step S107: YES), the output calculation unit 202 obtains the delay time τd at which Rmr(τ) is maximized (Step S108).

Figure 7:
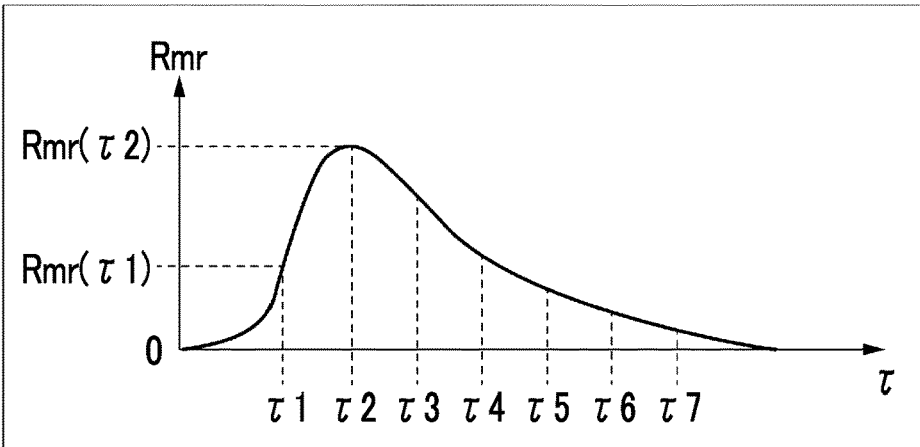
FIG. 7 is a view illustrating an example of a cross-correlation function according to the first embodiment of the present disclosure.

FIG. 7 is a view illustrating an example of the cross-correlation function according to the first embodiment of the present disclosure.

FIG. 7 illustrates a graph of the cross-correlation function Rmr(τ) for each delay time τ obtained by the output calculation unit 202. In the example in FIG. 7, the delay time at which the cross-correlation function Rmr(τ) is maximized is "τ2". Therefore, the output calculation unit 202 sets the delay time τd in the division period to "τ2 (two minutes)".

Next, with reference back to FIG. 4, the output calculation unit 202 and the efficiency calculation unit 203 calculate the plant output Pc and plant efficiency n at each of times t0 to tn in the evaluation period of the first operation mode (Step S200).

Figure 8:
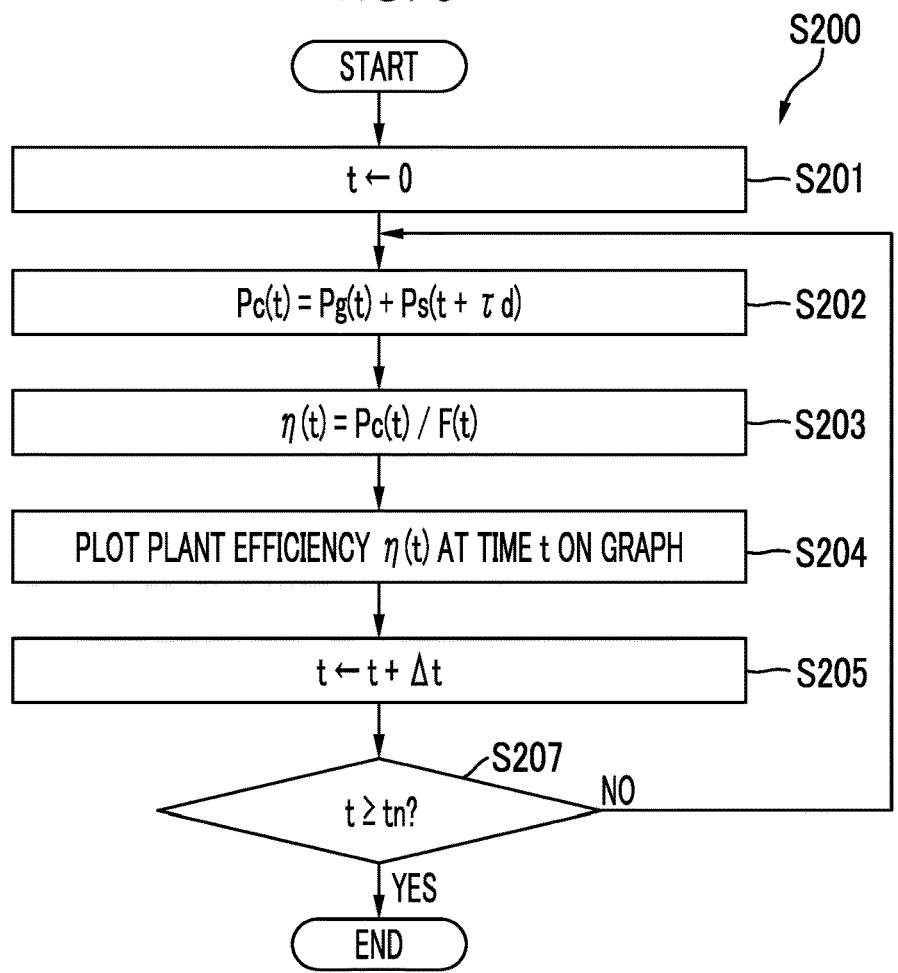
FIG. 8 is a fourth flowchart illustrating a process example of the performance evaluation device according to the first embodiment of the present disclosure.

FIG. 8 is a fourth flowchart illustrating a process example of the performance evaluation device according to the first embodiment of the present disclosure.

As illustrated in FIG. 8, the output calculation unit 202 initializes t indicating a time within the evaluation period (Step S201).

Next, as expressed in Equation (4), the output calculation unit 202 adds the gas turbine output Pg(t) at the time τ and the steam turbine output Ps(t+τd) after the delay time τd from the time t, and calculates the plant output Pc at the time τ (Step S202). At this time, the output calculation unit 202 calculates the plant output Pc at each time within the division period by using the delay time τd for each division period. For example, the plant output Pc at each of the times t0 to t7 in the first division period is calculated by using the delay time τd1 in the first division period. Similarly, for the second division period, the third division period, and so forth, the delay time τd2 in the second division period, the delay time τd3 in the third division period, and so forth are used to calculate the plant output Pc for each time in each division period.

[Equation 4]

$$Pc(t)=Pg(t)+Ps(t+\tau d) \quad (4)$$

Next, as expressed in Equation (5), the efficiency calculation unit 203 calculates the plant efficiency n (energy efficiency) at the time τ (Step S203).

[Equation 5]

$$\eta(t)=Pc(t)/F(t) \quad (5)$$

Figure 9:
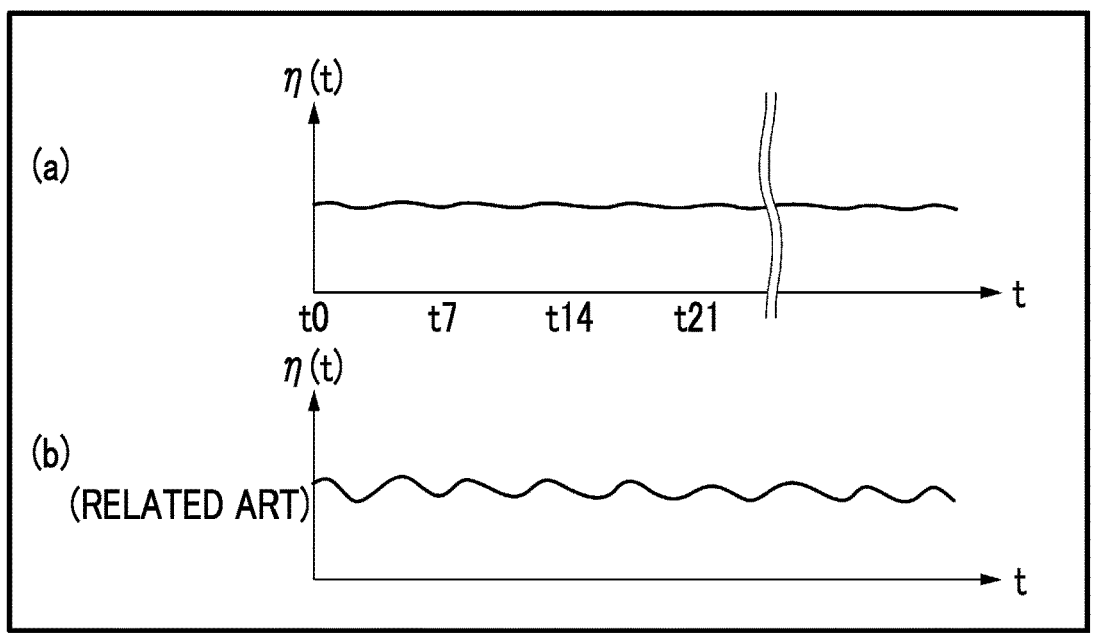
FIG. 9 is a view illustrating an example of plant efficiency according to the first embodiment of the present disclosure.

FIG. 9 is a view illustrating an example of the plant efficiency according to the first embodiment of the present disclosure.

FIG. 9(a) illustrates an example of the plant efficiency n calculated based on the plant output Pc (plant output in FIG. 5(d) "Pc(t)=Pg(t)+Ps(t+τd)") calculated in view of the delay time τ of the steam turbine output Ps in the present embodiment. In addition, as a comparison, FIG. 9(b) illustrates an example of the plant efficiency n calculated, based on the plant output Pc (plant output in FIG. 5(e) "Pc(t)=Pg(t)+Ps(t)") calculated without considering the delay time of the steam turbine output Ps as in the related art.

The efficiency calculation unit 203 plots the calculated plant efficiency n at the time τ on a graph in FIG. 9(a) (Step S204). The graph may be displayed on a display connected to the performance evaluation device by the output processing unit 205.

Next, the efficiency calculation unit 203 increases the time τ by a prescribed time period Δt (Step S205). The prescribed time period Δt is set according to the sampling time (for example, one minute).

In addition, the efficiency calculation unit 203 determines whether the plant efficiency η is calculated at all times (times t0 to tn) in the evaluation period (Step S207). When the plant efficiency η at all times up to the time tn is not calculated (Step S207: NO), the efficiency calculation unit 203 returns to Step S202, and performs each of the above-described steps again at the subsequent time. On the other hand, when the efficiency calculation unit 203 calculates the plant efficiency η at all times up to the time tn (Step S207: YES), the process proceeds to Step S300 in FIG. 4. When the efficiency calculation unit 203 calculates all of the plant efficiency η at each time in the evaluation period, the efficiency calculation unit 203 can obtain the graph as illustrated in FIG. 9(a). Compared to the plant efficiency η (FIG. 9(b)) calculated by using a method in the related art, noise of the plant efficiency η calculated by the efficiency calculation unit 203 according to the present embodiment can be reduced, and the plant efficiency can be more accurately evaluated.

The efficiency calculation unit 203 may express the plant efficiency of the power generation plant 10 by using a heat rate HR. As illustrated in FIG. 4, the efficiency calculation unit 203 according to the present embodiment further calculates an average heat rate HRav of the plant efficiency for each load section of the power generation plant 10 (Step S300).

Figure 10:
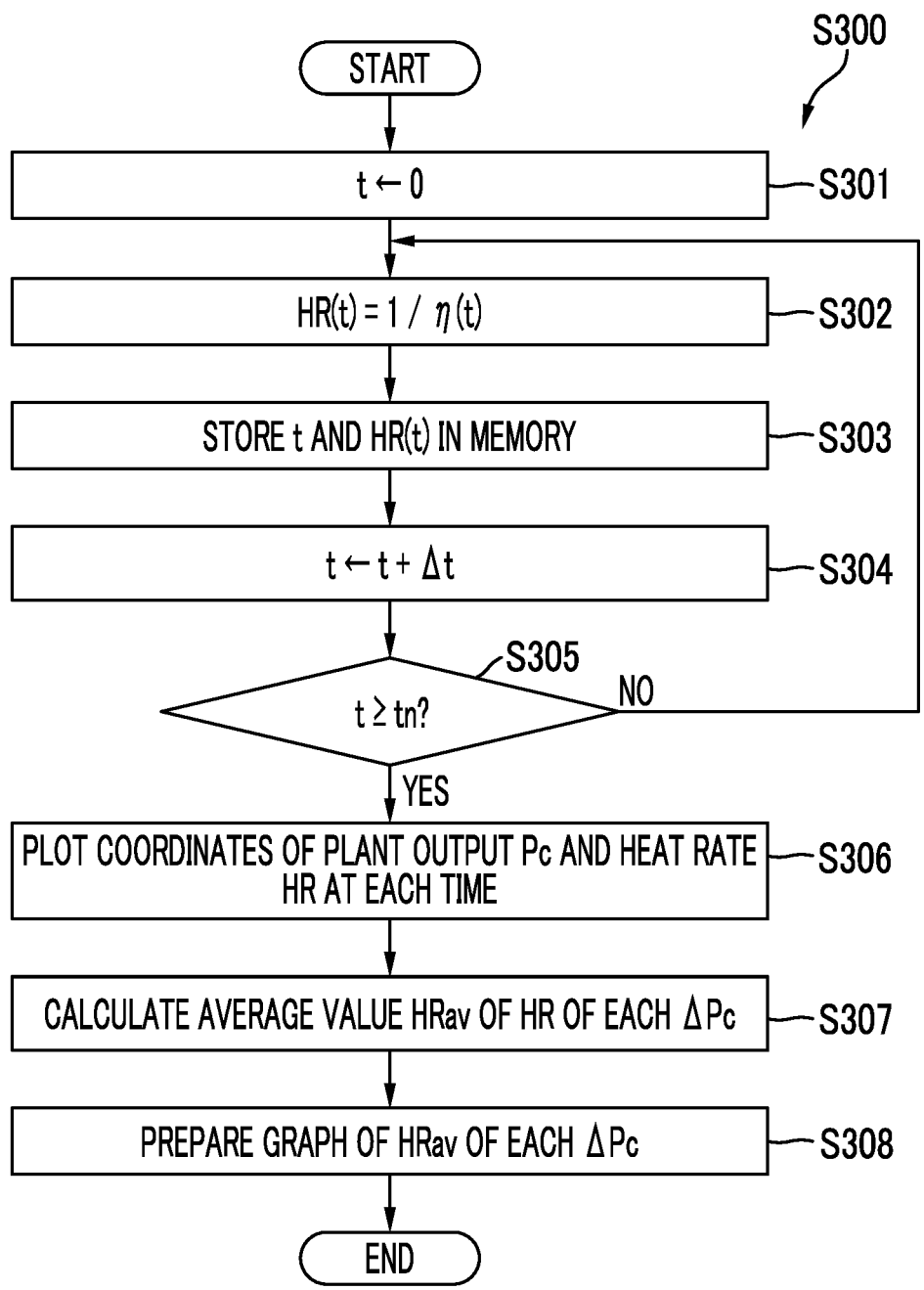
FIG. 10 is a fifth flowchart illustrating a process example of the performance evaluation device according to the first embodiment of the present disclosure.

FIG. 10 is a fifth flowchart illustrating a process example of the performance evaluation device according to the first embodiment of the present disclosure.

Hereinafter, with reference to FIG. 10, a process in which the efficiency calculation unit 203 obtains the average heat rate HRav of the plant efficiency will be described in detail.

First, the efficiency calculation unit 203 initializes t indicating a time within the evaluation period (Step S301).

Next, the efficiency calculation unit 203 obtains a heat rate HR(t) indicating the plant efficiency at the time τ via Equation (6) below (Step S302).

[Equation 6]

$$HR(t)=1/\eta(t) \quad (6)$$

In addition, the efficiency calculation unit 203 causes the memory 206 to store the time t, a plant output Pc(t) at the time t, and the calculated heat rate HR(t) at the time τ in association with each other (Step S303).

Next, the efficiency calculation unit 203 increases the time t by the prescribed time period Δt (Step S304). The prescribed time period Δt is set according to the sampling time (for example, one minute).

In addition, the efficiency calculation unit 203 determines whether the heat rate HR is calculated at all times (times t0 to tn) in the evaluation period (Step S305). When the efficiency calculation unit 203 does not calculate all of the heat rates HR up to the time tn (Step S305: NO), the efficiency calculation unit 203 returns to Step S302, and performs a process of calculating the heat rate HR at the subsequent time. On the other hand, when the efficiency calculation unit 203 calculates the heat rate HR at all times up to the time tn (Step S305: YES), the efficiency calculation unit 203 prepares a graph obtained by plotting coordinates of the plant output Pc and the heat rate HR at each time (Step S306). This graph indicates that the performance of the power generation plant 10 is more satisfactory the lower the heat rate HR is.

Figure 11:
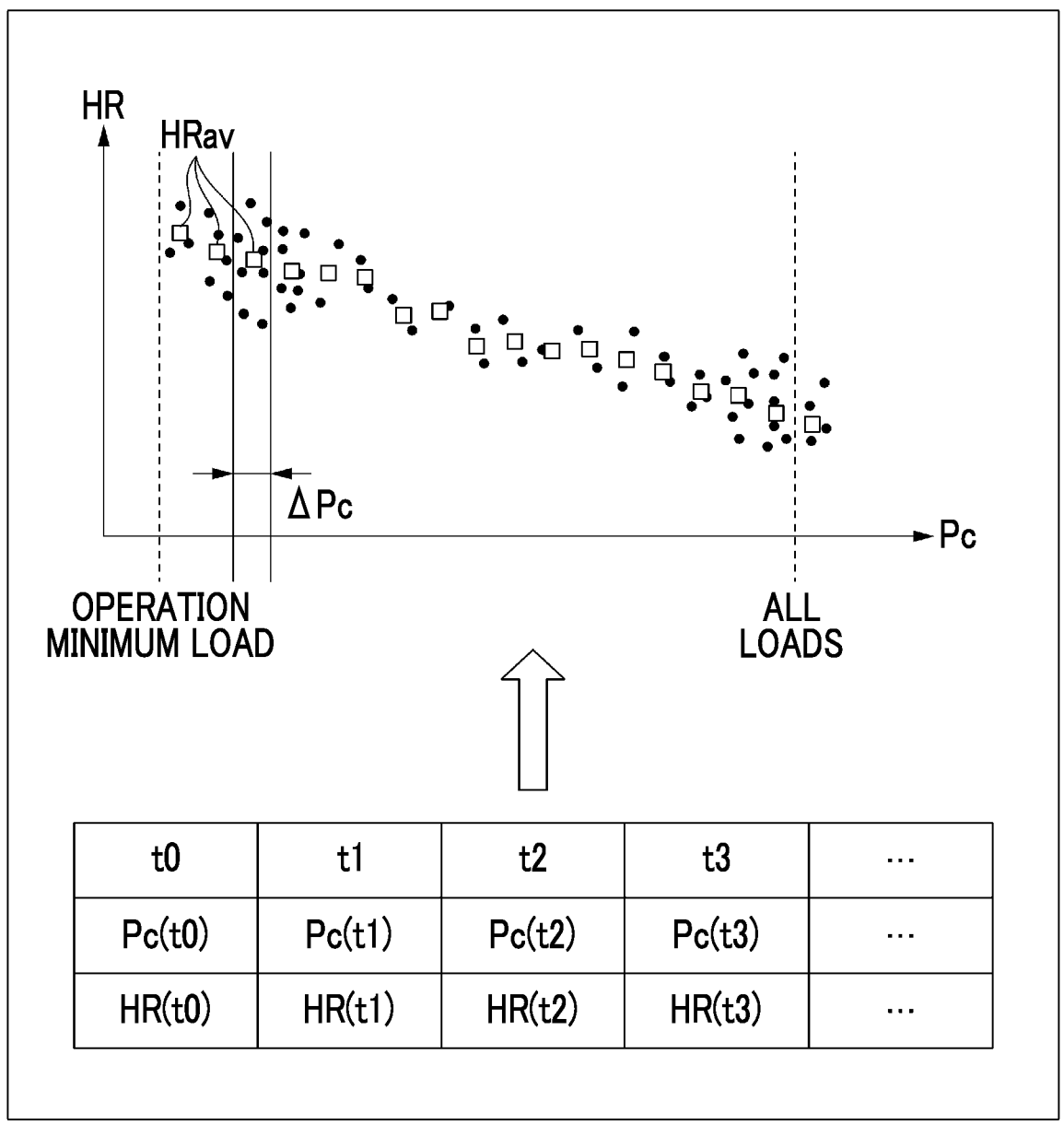
FIG. 11 is a view illustrating an example of a plant output and a heat rate according to the first embodiment of the present disclosure.

FIG. 11 is a view illustrating an example of the plant output and the heat rate according to the first embodiment of the present disclosure.

In the graph in FIG. 11, a vertical axis represents the heat rate HR, and a horizontal axis represents the plant output Pc. The efficiency calculation unit 203 plots the plant output Pc and the heat rate HR at each of the times t0 to tn recorded in the memory 206 on the graph, and obtains a graph indicating a distribution of the heat rate HR corresponding to the plant output Pc of the power generation plant 10.

Next, the efficiency calculation unit 203 obtains the average heat rate HRav for each section (ΔPc) of the plant output Pc (Step S307). For example, the efficiency calculation unit 203 obtains the average heat rate HRav for every 10 MW. At this time, in a case where the heat rate HR greatly fluctuates, the efficiency calculation unit 203 may perform filtering (for example, adopting only data within 4σ), based on a standard deviation of the fluctuation. When the fluctuation falls within a predetermined range in view of the delay time τ of the steam turbine output Ps, the filtering based on the standard deviation may be omitted.

In addition, as illustrated in FIG. 11, the efficiency calculation unit 203 prepares a graph obtained by plotting the average heat rate HRav of each section (Step S308). The graph may be displayed on a display connected to the performance evaluation device by the output processing unit 205.

When the performance evaluation (calculation of the plant output Pc, the plant efficiency η, and the average heat rate HRav for each section (every 10 MW) of the plant output) before switching the operation mode (first operation mode) is completed, the performance evaluation device 20 returns to FIG. 3, and performs the performance evaluation after switching the operation mode (second operation mode) (Steps S12 to S13).

The acquisition unit 201 acquires the sampling value of the second operation mode from the data server 30 (Step S12).

When the sampling value is acquired, the output calculation unit 202 and the efficiency calculation unit 203 evaluate the performance of the second operation mode of the power generation plant 10 (Step S13). The process flow is the same as the process (Step S11) of evaluating the performance of the first operation mode described above.

Next, the comparison unit 204 compares the average heat rates HRav of the first operation mode and the second operation mode with each other. In the present embodiment, compared to the first operation mode, the comparison unit 204 evaluates an improvement degree of the performance of the second operation mode. In this case, as expressed in Equation (7), the comparison unit 204 obtains a heat rate difference HRe by subtracting an average heat rate HRav1 of the first operation mode from an average heat rate HRav2 of the second operation mode for each section (every 10 MW) of the plant output (Step S14).

[Equation 7]

$$HRe = HRav2 - HRav1 \quad (7)$$

Figure 12:
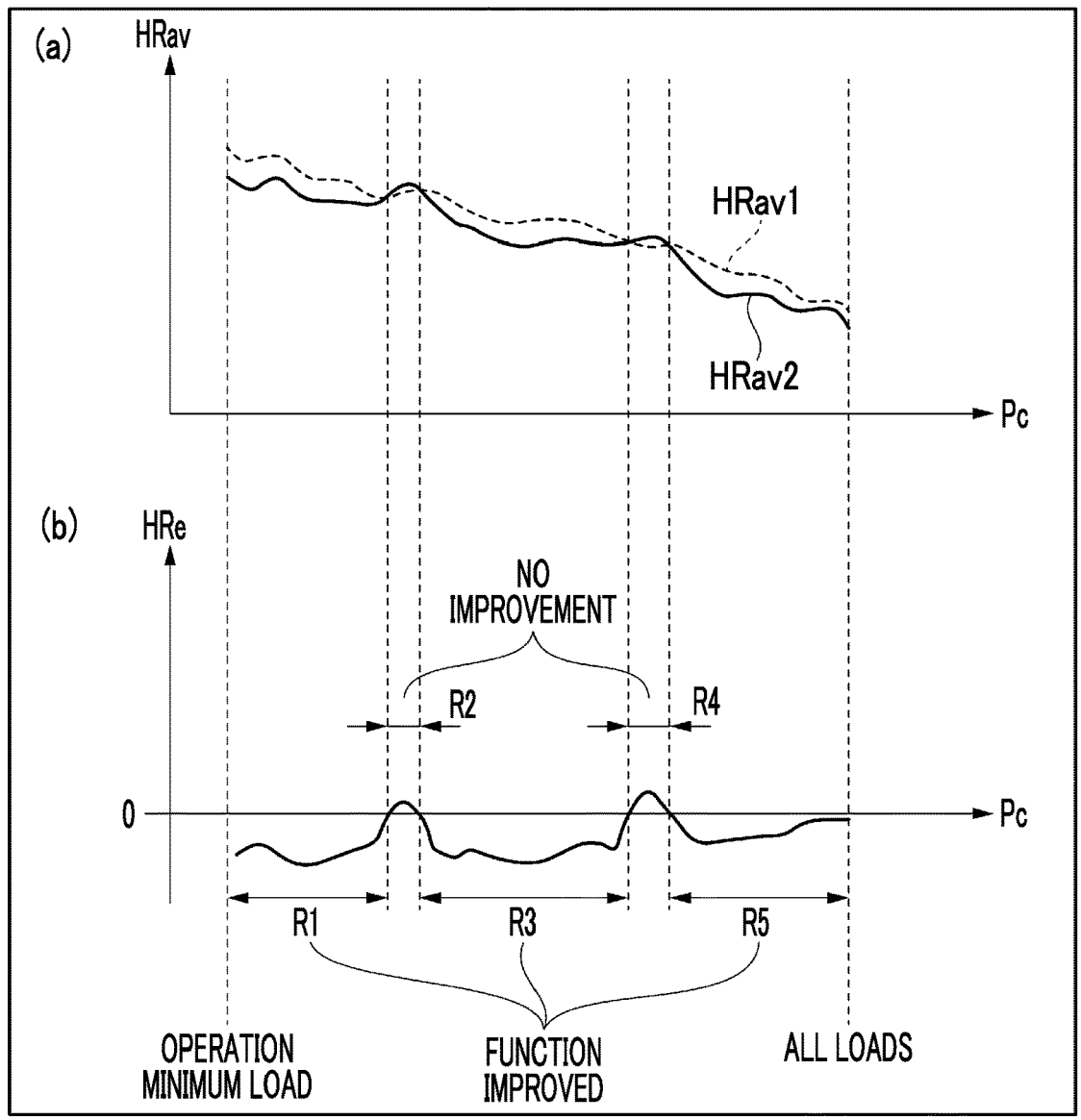
FIG. 12 is a view illustrating an example of an average heat rate of a first operation mode and a second operation mode according to the first embodiment of the present disclosure.

FIG. 12 is a view illustrating an example of a performance difference between the first operation mode and the second operation mode according to the first embodiment of the present disclosure.

As illustrated in FIG. 12(a), the comparison unit 204 prepares a graph in which the average heat rate HRav1 in the first operation mode and the average heat rate HRav2 in the second operation mode are compared with each other. In addition, as illustrated in FIG. 12(b), the comparison unit 204 prepares a graph indicating the heat rate difference HRe between the first operation mode and the second operation mode for each section (every 10 MW) of the plant output. The comparison unit 204 may combine these graphs into one graph.

The lower the heat rate HR is, the more satisfactory the performance of the power generation plant 10 is. Therefore, when the heat rate difference HRe is less than zero (negative value), the comparison unit 204 determines that the second operation mode has more satisfactory performance. In addition, the lower the heat rate difference HRe is below zero and the smaller the value of the average heat rate HRav is, it is determined that the higher an improvement degree of the performance in the second operation mode is. In an example in FIG. 12, the comparison unit 204 determines that the performance of the power generation plant 10 is more satisfactory in the second operation mode with regard to sections R1, R3, and R5 in which the heat rate difference HRe is less than zero. On the other hand, when the heat rate difference HRe is zero, the comparison unit 204 determines that there is no performance difference between the first operation mode and the second operation mode, and determines that the performance of the power generation plant 10 is more satisfactory in the first operation mode in sections R2 and R4 in which the heat rate difference HRe is zero or greater (positive value).

Next, the output processing unit 205 outputs (transmits) a determination result of the comparison unit 204 (presence or absence of performance improvement by switching the operation mode to the second operation mode and improvement degree) to the control device 160, as an evaluation result of the performance evaluation device 20 (Step S15). In addition, the output processing unit 205 may display the evaluation result on a display connected to the performance evaluation device.

The evaluation results may further include at least one of a time history of the plant output Pc calculated by the output calculation unit 202 (graph in FIG. 5(d)), a time history of the plant efficiency η calculated by the efficiency calculation unit 203 (graph in FIG. 9(a)), a distribution of the heat rate HR and the average heat rate HRav for each plant output section (ΔPc) of each operation mode calculated by the efficiency calculation unit 203 (graph in FIG. 11), and comparison graphs between the first operation mode and the second operation mode which are prepared by the comparison unit 204 (graph of the average heat rate HRav in FIG. 12(a) and graph of the heat rate difference HRe in FIG. 12(b)).

In addition, the control device 160 displays the evaluation result received from the performance evaluation device 20 on the display unit 163. At this time, in the subsequent operation control process, the operation control unit 161 of the control device 160 may perform automatic control for switching the operation mode from the first operation mode to the second operation mode, when the current plant output Pc is included in the sections (sections R1, R3, and R5 in FIG. 12) in which the second operation mode has the more satisfactory performance. In addition, when the current plant output Pc is included in the sections (sections R2 and R4 in FIG. 12) in which the first operation mode has the more satisfactory performance, the operation control unit 161 performs the automatic control for switching the operation mode from the second operation mode to the first operation mode. Furthermore, the control device 160 may perform manual control for switching the operation mode in accordance with the operation by receiving the operation of the operator confirming the display unit 163.

Each time the operation mode of the power generation plant 10 is switched by a manual operation of the operator, the performance evaluation device 20 performs each of the above-described processes to evaluate the performance before and after the operation mode is switched.

In another embodiment, based on operation data of the power generation plant 10 which is collected via the data server 30, the performance evaluation device 20 may detect that the operation mode is switched by the manual control or the automatic control, and may automatically evaluate the performance before and after the operation mode is switched.

In still another embodiment, the performance evaluation device 20 may evaluate the performance of the power generation plant 10, when instructed to evaluate the performance by the control device 160. For example, after a periodic inspection of the power generation plant 10 is performed, the operator performs a start operation for evaluating the performance through the operation reception unit 162 of the control device 160. In this case, the control device 160 instructs the performance evaluation device 20 to perform the evaluation for comparing the operation performance in a prescribed period before the periodic inspection and the operation performance in a prescribed period after the periodic inspection with each other. At this time, the prescribed period before and after the periodic inspection may be designated in any desired way by the operator through the operation reception unit 162 of the control device 160. In addition, the operator may perform the start operation for evaluating the performance at any desired time during a commercial operation, regardless of the presence or absence of the periodic inspection.

In the above-described example, an aspect has been described in which the output calculation unit 202 obtains the delay time id in each division period during which the evaluation period is divided into a prescribed time period. However, the present disclosure is not limited thereto. In another embodiment, the output calculation unit 202 may obtain the delay time τd for each load band by dividing the evaluation period into each load band of the power generation plant 10. For example, the output calculation unit 202 may obtain each of the delay time τd1 during an operation period in a load band with an output of 81% to 90%, and the delay time τd2 during an operation period in a load band with an output of 91% to 100%. In addition, the output calculation unit 202 uses the delay time τd1 to calculate the plant output Pc for each time during an operation period in the load band with the output of 81% to 90%. Similarly, the output calculation unit 202 uses the delay time τd2 to calculate the plant output Pc for each time during the operation period in the load band with the output of 91% to 100%.

(Hardware Configuration)

Figure 13:
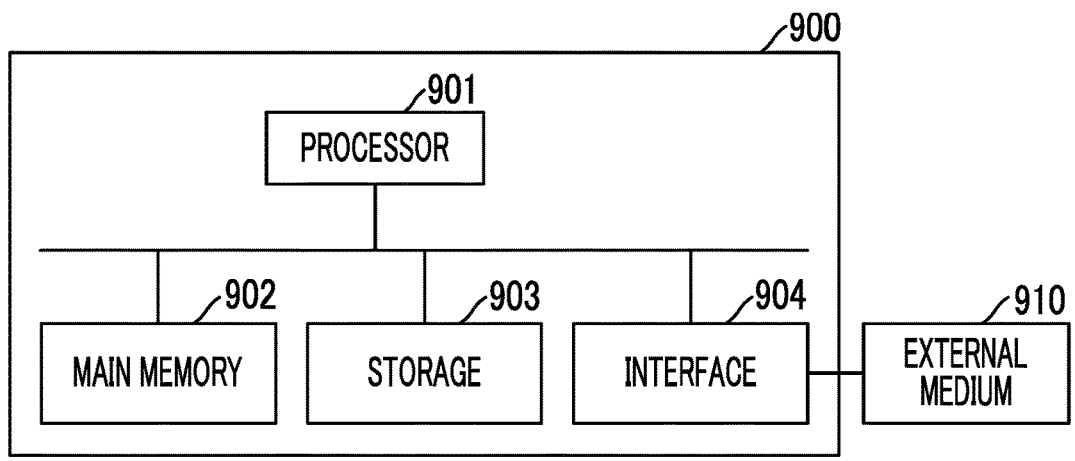
FIG. 13 is a view illustrating an example of a hardware configuration of the performance evaluation device and a control device according to the first embodiment of the present disclosure.

FIG. 13 is a view illustrating an example of a hardware configuration of the performance evaluation device and the control device according to the first embodiment of the present disclosure.

As illustrated in FIG. 13, a computer 900 includes a processor 901, a main memory 902, a storage 903, and an interface 904.

The performance evaluation device 20 and the control device 160 which are described above are respectively installed in the computer 900. An operation of each processing unit described above is stored in the storage 903 in a form of a program. The processor 901 reads the program from the storage 903, develops the program in the main memory 902, and performs the above-described processes in accordance with the program. In addition, the processor 901 secures a storage area corresponding to each storage unit described above in the main memory 902 in accordance with the program.

The program may partially realize functions fulfilled by the computer 900. For example, the program may cause the functions to be fulfilled in combination with another program already stored in the storage 903 or in combination with another program installed in another device. In another embodiment, in addition to the above-described configuration or in place of the above-described configuration, the computer 900 may include a custom large scale integrated circuit (LSI) such as a programmable logic device (PLD). Examples of the PLD include a programmable array logic (PAL), a generic array logic (GAL), a complex programmable logic device (CPLD), and a field programmable gate array (FPGA). In this case, functions realized by the processor 901 may be partially or entirely realized by the integrated circuit.

Examples of the storage 903 include a magnetic disk, a magneto-optical disk, an optical disk, and a semiconductor memory. The storage 903 may be an internal medium directly connected to a bus of the computer 900, or an external medium 910 connected to the computer 900 via the interface 904 or a communication line. In addition, when this program is distributed to the computer 900 via the communication line, the computer 900 receiving the distribution may develop the program in the main memory 902, and may perform the above-described process. In at least one embodiment, the storage 903 is a non-temporary tangible storage medium.

In addition, the program may be used to partially realize the above-described functions. Furthermore, the program may be a so-called difference file (difference program) that realizes the above-described functions in combination with stored in the storage 903.

(Operational Effect)

As described above, in the performance evaluation device 20 and the performance evaluation method according to the present embodiment, the output calculation unit 202 performs a process of obtaining a plant output Pc(t) which is a total output of a gas turbine output Pg(t) measured at a first time τ and a steam turbine output Ps(t+τ) measured at a second time t+τ after a delay time τ of the steam turbine output Ps.

As described above, the steam turbine 130 is driven by using the steam generated by the heat of the exhaust gas from the gas turbine 100. Therefore, the fluctuation of the steam turbine output Ps occurs later than the fluctuation of the gas turbine output Pg. Therefore, in data measured during the commercial operation in which the load of the power generation plant fluctuates from moment to moment depending on power demand, the data is affected by a delay in the steam turbine output Ps, and greatly fluctuates. In this case, as in the method in the related art, when the gas turbine output Pg(t) and the steam turbine output Ps(t) which are measured at the same time t are simply summed up, it is difficult to obtain (evaluate) an accurate plant output Pc of the power generation plant. In contrast, the output calculation unit 202 according to the present embodiment takes into consideration the delay time τ of the output of the steam turbine 130. In this manner, even when using the data measured during the commercial operation in which the load frequently fluctuates, the output calculation unit 202 can obtain a more accurate plant output Pc of the power generation plant 10.

In addition, in the performance evaluation device 20 and the performance evaluation method according to the present embodiment, the output calculation unit 202 obtains a fixed value id of the delay time of the steam turbine output Ps, based on the gas turbine output Pg and the steam turbine output Ps. Specifically, the output calculation unit 202 obtains the fixed value id of the delay time from a maximum value of a cross-correlation function between the gas turbine output Pg and the steam turbine output Ps which are measured for a prescribed time period (for example, 60 minutes, which represents an evaluation period before and after switching the operation mode).

It is assumed that there is a correlation between the gas turbine output Pg and the steam turbine output Ps. Therefore, since the fixed value td of the delay time is obtained from the maximum value (most correlative value) of the cross-correlation function therebetween, it is possible to obtain a value estimated to be closer to an actual delay time.

In addition, in the performance evaluation device 20 and the performance evaluation method according to the present embodiment, the acquisition unit 201 further acquires the sampling value of the fuel flow rate F, and the efficiency calculation unit 203 obtains the plant efficiency η and the heat rate HR of the power generation plant 10, based on the fuel flow rate F and the plant output Pc.

In this way, the performance of the power generation plant 10 can be evaluated by using the plant efficiency η or the heat rate HR.

In addition, in the performance evaluation device 20 and the performance evaluation method according to the present embodiment, the efficiency calculation unit 203 obtains the average efficiency HRav for each section (for example, every 10 MW) of the plant output Pc, based on the relationship between the plant output Pc and the plant efficiency (heat rate HR).

In this way, it is possible to provide data that enables a user to easily understand a tendency of the plant efficiency (average heat rate HRav) for each section of the plant output Pc.

In addition, in the performance evaluation device 20 and the performance evaluation method according to the present embodiment, the comparison unit 204 compares the average efficiency HRav for each section in the first operation mode and the average efficiency HRav for each section in the second operation mode with each other. For example, the first operation mode is the operation mode before the operation mode of the power generation plant 10 is switched, and the second operation mode is the operation mode after the operation mode is switched.

In this way, both performances of the two different operation modes can be compared with each other. Therefore, it is possible to provide data that enables a user to easily understand which operation mode is expected to improve the performance for each section of the plant output Pc.

In addition, in the performance evaluation device 20 and the performance evaluation method according to the present embodiment, the first operation mode may be an operation before the periodic inspection of the power generation plant 10, and the second operation mode may be an operation after the periodic inspection.

In this way, it is possible to provide data which enables a user to easily understand whether or not the performance is improved by the periodic inspection.

In addition, the operator may perform the start operation for evaluating the performance of the power generation plant 10 at any desired time through the control device 160. In this case, the performance evaluation device 20 evaluates the performance for a prescribed time period of n minutes before and after receiving an instruction from the control device 160.

In this way, the operator can check the performance of the power generation plant 10 at any time without waiting for the periodic inspection to be performed. In this way, the operator can quickly recognize whether the performance of the power generation plant 10 deteriorates.

In addition, in the performance evaluation system 1 and the operation control method according to the present embodiment, the operation control unit 161 of the control device 160 performs control for switching the operation mode to the second operation mode in a section in which the performance in the second operation mode is more satisfactory than the performance in the first operation mode, as a result of the performance evaluation.

In this way, the power generation plant 10 can be more efficiently operated. In addition, the control device 160 may display a result of the performance evaluation on the display unit 163, and may show the operator which operation mode in any section has more satisfactory performance. In this manner, the operator can properly perform the switching operation of the operation mode.

Hitherto, although the embodiments of the present disclosure have been described in detail, the present disclosure is not limited thereto as long as the embodiments do not deviate from the technical idea of the present disclosure, and design changes can be adopted to some extent. Hereinafter, modification examples of the above-described first embodiment will be described.

Modification Example 1

In the above-described first embodiment, an aspect has been described in which the output calculation unit 202 obtains the delay time τ of the steam turbine output Ps, based on the cross-correlation function between the gas turbine output Pg and the steam turbine output Ps. However, the present disclosure is not limited thereto. In Modification Example 1, an aspect will be described in which the output calculation unit 202 obtains the delay time τ by analyzing extreme values of the gas turbine output Pg and the steam turbine output Ps.

Figure 14:
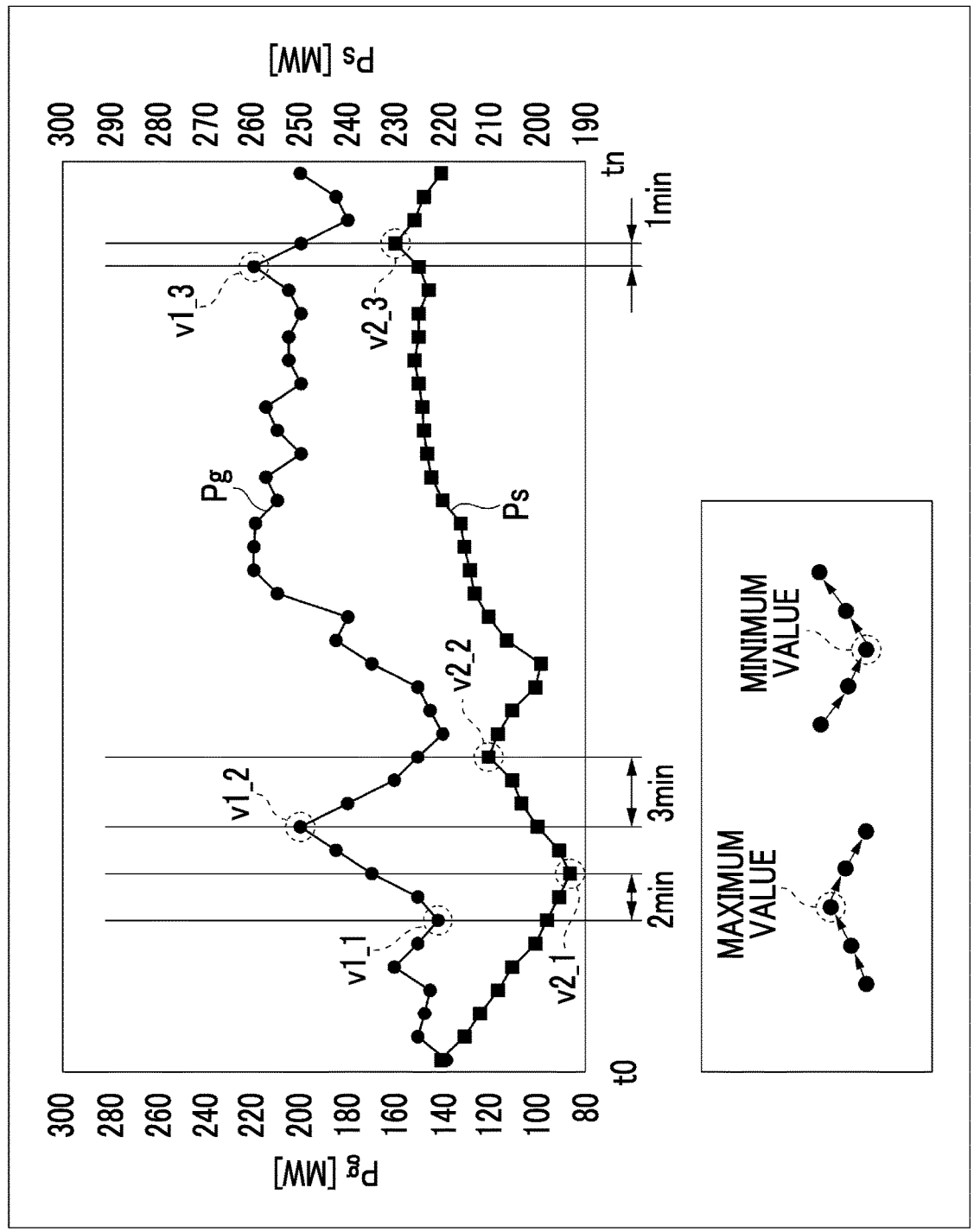
FIG. 14 is a view illustrating an example of an average heat rate of a gas turbine output and a steam turbine output according to Modification Example 1 of the present disclosure.

FIG. 14 is a view illustrating an example of the average heat rates of the gas turbine output and the steam turbine output according to Modification Example 1 of the present disclosure.

Figure 15:
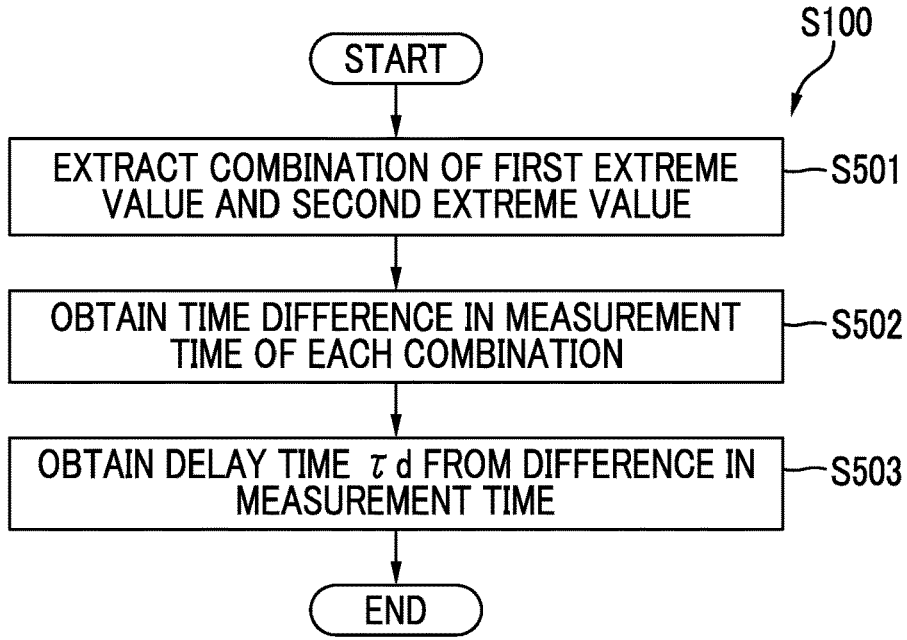
FIG. 15 is a flowchart illustrating a process example of a performance evaluation device according to Modification Example 1 of the present disclosure.

FIG. 15 is a flowchart illustrating a process example of a performance evaluation device according to Modification Example 1 of the present disclosure.

Hereinafter, with reference to FIGS. 14 and 15, a process in which the output calculation unit 202 according to Modification Example 1 obtains a delay time τd will be described in detail. In addition, the output calculation unit 202 according to the present modification example performs a process illustrated in FIG. 15, instead of the process illustrated in FIG. 6 of the first embodiment.

(Process Flow of Performance Evaluation System)

As illustrated in FIG. 15, the output calculation unit 202 according to the present modification example extracts a combination of a first extreme value v1 (maximum value and minimum value) of the gas turbine output Pg measured during the evaluation period (times t0 to tn) and a second extreme value v2 (maximum value and minimum value) of the steam turbine output Ps (Step S501). In an example in FIG. 14, the output calculation unit 202 first extracts first extreme values v1_1 (minimum value), v1_2 (maximum value), and v1_3 (maximum value) of the gas turbine output Pg. In addition, the output calculation unit 202 extracts second extreme values v2_1 (minimum value), v2_2 (maximum value), and v2_3 (maximum value) of the steam turbine output Ps. The output calculation unit 202 specifies a combination of the first extreme value v1 and the second extreme value v2 adjacent to the first extreme value v1 in a time series at a time after the first extreme value v1.

For example, the output calculation unit 202 may extract a greatest value as the maximum value, and may extract a smallest value as the minimum value, from three sampling values which are consecutive in a time series. However, in this case, when the sampling value increases or decreases due to noise, there is a possibility that the sampling value is extracted as the maximum value or the minimum value. Therefore, the output calculation unit 202 according to the present modification example refers to the sampling value at every five sampling values consecutive in a time series, and extracts the maximum value and the minimum value. Specifically, as illustrated in FIG. 14, the output calculation unit 202 extracts the maximum value after the sampling value consecutively increases twice in a time series, or the minimum value after the sampling value consecutively decreases twice in a time series.

Next, the output calculation unit 202 obtains a time difference in a measurement time of each combination (Step S502). In an example in FIG. 14, the time difference in the measurement time of the combination of the first extreme value v1_1 and the second extreme value v2_1 is "two minutes". The time difference in the measurement time of the combination of the first extreme value v1_2 and the second extreme value v2_2 is "three minutes". The time difference in the measurement time of the combination of the first extreme value v1_3 and the second extreme value v2_3 is "one minute".

In addition, the output calculation unit 202 obtains a value obtained by averaging the time differences in the measurement times, as the delay time τd of the steam turbine output Ps in the evaluation periods t0 to tn (Step S503).

The output calculation unit 202 calculates the plant output Pc for each time of the evaluation periods t0 to tn by using the delay time τd obtained in this way. The process of calculating the plant output Pc is the same as the process in the first embodiment.

(Operational Effect)

As described above, in the performance evaluation device 20 and the performance evaluation method according to the present modification example, the output calculation unit 202 specifies a combination of extreme values consecutive in the time series of the gas turbine output Pg and the steam turbine output Ps which are measured within the evaluation period (times t0 to tn), averages the time differences in the measurement times of the first extreme value v1 and the second extreme value v2 in each combination, and obtains the fixed value td of the delay time of the steam turbine output Ps applied to the evaluation period.

In this way, the delay time τd of the steam turbine output Ps can be obtained by performing a process simpler than that of the first embodiment.

In Step S503, the output calculation unit 202 according to the present modification example may set the time difference in the measurement times of the first extreme value v1 and the second extreme value v2, as the delay time id applied to the period from the time at which the first extreme value v1 is measured to the time at which the first extreme value v1 is subsequently measured. In the example in FIG. 14, the output calculation unit 202 sets the time difference of "two minutes" in the measurement times of the first extreme value v1_1 and the second extreme value v2_1, as the delay time id of the period from the measurement time of the first extreme value v1_1 to the measurement time of the subsequent first extreme value v1_2. Similarly, the output calculation unit 202 sets the time difference of "three minutes" in the measurement times of the first extreme value v1_2 and the second extreme value v2_2, as the delay time τd of the period from the measurement time of the first extreme value v1_2 to the measurement time of the next first extreme value v1_3.

In this manner, the delay time id can be finely adjusted for each section in the evaluation period by performing a process simpler than that of the first embodiment.

In addition, the output calculation unit 202 extracts the maximum value after the sampling value consecutively increases twice in a time series or the minimum value after the sampling value consecutively decreases twice in a time series, as the first extreme value v1. Similarly, the output calculation unit 202 extracts the maximum value after the sampling value consecutively increases twice in a time series, or the minimum value after the sampling value consecutively decreases twice in a time series, as the second extreme value v2.

In this way, it is possible to more accurately extract the first extreme value v1 and the second extreme value v2 by reducing a probability that an increase or a decrease in the sampling value may be affected by noise.

Modification Example 2

In addition, in the above-described first embodiment, an aspect has been described in which the output calculation unit 202 obtains the plant output Pc(t) at the first time τ by summing up the gas turbine output Pg(t) at the first time τ and the steam turbine output Ps(t+τd) at the second time t+τd after the delay time τd from the first time. However, the present disclosure is not limited thereto. In Modification Example 2, the second time corresponding to the first time t may include a plurality of times. Therefore, the output calculation unit 202 obtains the plant output Pc(t) at the first time t, based on the gas turbine output Pg(t) measured at the first time t and the steam turbine output Ps measured at each of a plurality of the second times corresponding to the first time t. Specifically, the output calculation unit 202 performs the following processes.

(Process Flow of Performance Evaluation System)

Figure 16:
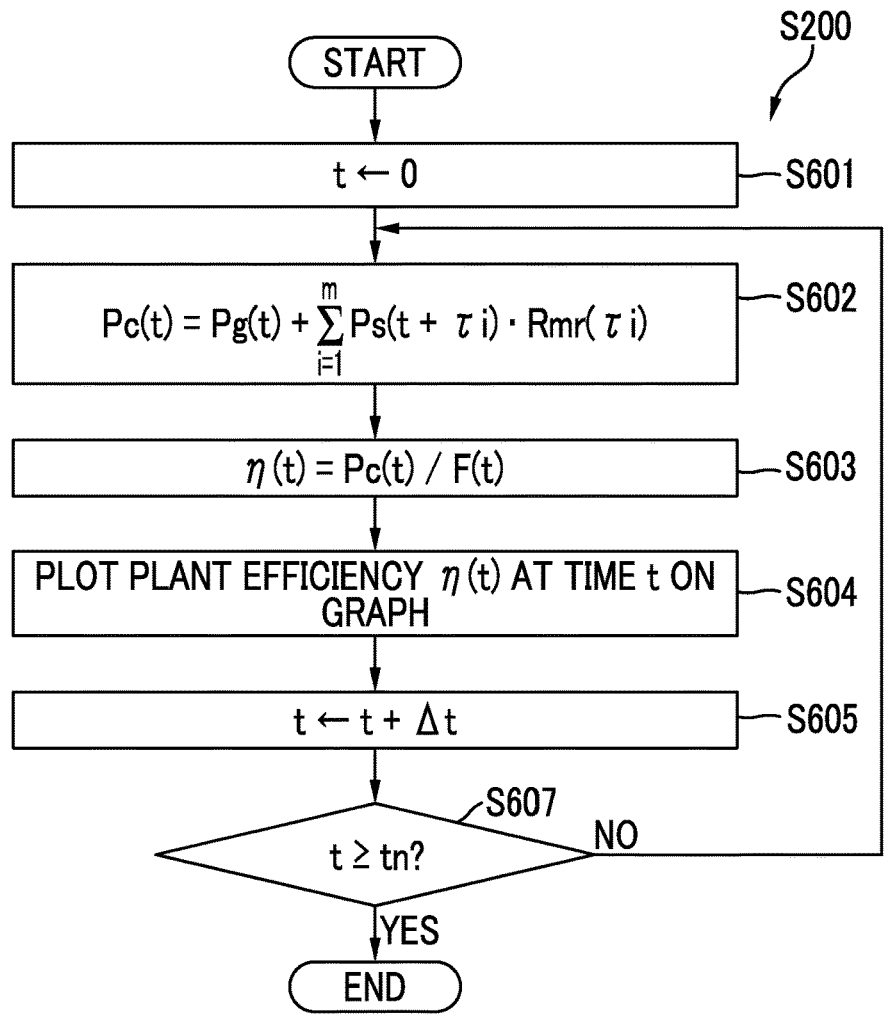
FIG. 16 is a flowchart illustrating a process example of a performance evaluation device according to Modification Example 2 of the present disclosure.

FIG. 16 is a flowchart illustrating a process example of a performance evaluation device according to Modification Example 2 of the present disclosure.

The output calculation unit 202 according to the present modification example performs Step S602 in FIG. 16, instead of Step S202 in FIG. 8. Steps S601 and S604 to S607 in FIG. 16 are the same as Steps S201 and S204 to S207 in FIG. 8, and thus, description thereof will be omitted.

The output calculation unit 202 multiplies a value of a cross-correlation function Rmr(τ) corresponding to each of the delay times τ0 to τm obtained in Steps S103 to S105 in FIG. 6 as a weighting coefficient of a steam turbine output Ps(t+τ) measured at each time of a plurality of second times t+τ (τ=1, 2, . . . , m) corresponding to the first time t. For example, the steam turbine output Ps(t+τ1) at a time t+τ1 is multiplied by a cross-correlation function Rmr(τ1) as the weighting coefficient, and a steam turbine output Ps(t+τ2) at a time t+τ2 is multiplied by a cross-correlation function Rmr(τ2) as the weighting coefficient. The same applies to the subsequent times t+τ3, . . . , t+τm. In addition, the output calculation unit 202 obtains the plant output Pc(t) at the first time τ by summing up a total value of the steam turbine outputs Ps of each of the second times t+τ1 to t+τm weighted by the cross-correlation function Rmr(τ) and the gas turbine output Pg(t) of the first time t. That is, the output calculation unit 202 obtains the plant output Pc(t1) at the time t1 by using Equation (8) (Step S602). In Equation (8), m is set to "seven (minutes)", for example. Similarly, the output calculation unit 202 obtains the plant output Pc at each of the times t0 to tn in the evaluation period by using Equation (8).

[Equation 8]

$$Pc(t) = Pg(t) + \sum_{i=1}^{m} Pd(t + \tau i) \cdot Rmr(\tau i) \qquad (8)$$

(Operational Effect)

As described above, the output calculation unit 202 according to the present modification example obtains the plant output Pc(t) at the first time τ by summing up the weighted value for each time based on the cross-correlation function Rmr(τ) and the gas turbine output Pg measured at the first time t, with regard to the steam turbine outputs Ps(t+τ) measured at each of the plurality of second times t+τ after the delay times τ1 to τm from the first time t.

The sampling values consecutive in a time series are affected by the sampling values in the past. As in this modification example, the steam turbine output Ps(t+τ) consecutive in a time series is weighted with the cross-correlation function Rmr(τ). In this manner, in view of influence of the sampling values in the past, a value of the steam turbine output Ps can be obtained. In this manner, accuracy of the plant output Pc can be improved.

APPENDIX

The performance evaluation method, the operation control method, the performance evaluation device, and the program which are described in the above-described embodiment can be understood as follows, for example.

According to a first aspect of the present disclosure, there is provided a performance evaluation method including a step of acquiring a sampling value of a gas turbine output and a sampling value of a steam turbine output which are measured at each time during an operation of a combined cycle power generation plant that generates power by using a gas turbine and a steam turbine, and a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

In this way, the plant output is obtained in view of the delay time of the output of the steam turbine. Therefore, even when using the data measured during the commercial operation in which the load frequently fluctuates, the plant output of the power generation plant can be more accurately obtained.

According to a second aspect of the present disclosure, in the step of obtaining the plant output of the performance evaluation method according to the first aspect, a fixed value of the delay time may be obtained, based on a plurality of the sampling values of the gas turbine output and a plurality of the sampling values of the steam turbine output.

It is assumed that there is a correlation between the gas turbine output and the steam turbine output. Therefore, as described above, the plant output can be more accurately obtained by obtaining the fixed value of the delay time, based on the sampling values of the gas turbine output and the steam turbine output.

According to a third aspect of the present disclosure, in the step of obtaining the plant output of the performance evaluation method according to the second aspect, a fixed value of the delay time may be obtained, based on a maximum value of a cross-correlation function between the sampling value of the gas turbine output and the sampling value of the steam turbine output which are measured within a prescribed time period.

In this way, the fixed value of the delay time can be obtained, based on the maximum value (most correlative value) of the cross-correlation function. Accordingly, it is possible to obtain a value estimated to be closer to an actual delay time.

According to a fourth aspect of the present disclosure, in the step of obtaining the plant output of the performance evaluation method according to the second aspect, based on the sampling value of the gas turbine output and the sampling value of the steam turbine output which are measured within a prescribed time period, the fixed value of the delay time may be obtained by specifying a combination of a first extreme value of the gas turbine output and a second extreme value of the steam turbine output which is adjacent to the first extreme value in a time series at a time after the first extreme value, and by averaging a time difference between measurement times of the first extreme value and the second extreme value in each of a plurality of the specified combinations.

In this way, the delay time of the steam turbine output can be obtained by a simple process.

According to a fifth aspect of the present disclosure, in the step of obtaining the plant output of the performance evaluation method according to the second aspect, based on the acquired sampling value of the gas turbine output and the acquired sampling value of the steam turbine output, a time difference in each measurement time of a first extreme value of the gas turbine output and a second extreme value of the steam turbine output which is adjacent to the first extreme value in a time series at a time after the first extreme value may be obtained, and the time difference may be set as the fixed value of the delay time during a period from a measurement time of the first extreme value to a subsequent measurement time of the first extreme value.

In this way, the delay time can be finely adjusted for each portion within a prescribed time period by performing a simple process.

According to a sixth aspect of the present disclosure, in the step of obtaining the plant output of the performance evaluation method according to the fourth or fifth aspect, the first extreme value and the second extreme value may be at least one of a maximum value after the sampling value consecutively increases twice and a minimum value after the sampling value consecutively decreases twice.

In this way, it is possible to more accurately extract the first extreme value and the second extreme value by reducing a probability that an increase or a decrease in the sampling value may be affected by noise.

According to a seventh aspect of the present disclosure, in the step of obtaining the plant output of the performance evaluation method according to the second aspect, based on a maximum value of a cross-correlation function between the sampling value of the gas turbine output and the sampling value of the steam turbine output which are measured within a division period, which is a part of an evaluation period of the combined cycle power generation plant, the fixed value of the delay time in the division period may be obtained.

The fixed value of the delay time can be obtained in this way, based on the maximum value (most correlative value) of the cross-correlation function. Accordingly, it is possible to obtain a value estimated to be closer to an actual delay time. In addition, the evaluation period is further divided into a plurality of division periods, and the delay time in each division period can be obtained. Accordingly, the plant output can be more accurately obtained.

According to an eighth aspect of the present disclosure, in the step of obtaining the plant output of the performance evaluation method according to the first aspect, a cross-correlation function between the sampling value of the gas turbine output and the sampling value of the steam turbine output which are measured within a prescribed time period may be obtained. The second time may include a plurality of times. The plant output may be obtained by summing up a weighted value for each time based on the cross-correlation function, and the gas turbine output measured at the first time, with regard to each of the sampling values of the steam turbine output which are measured at each time included in the second time.

In this way, in view of influence of the sampling values in the past, a value of the steam turbine output can be obtained. In this manner, accuracy of the plant output can be improved.

According to a ninth aspect of the present disclosure, the performance evaluation method according to any one of the first to eighth aspects may further include a step of acquiring a sampling value of a fuel flow rate measured at each time during an operation of the combined cycle power generation plant, and a step of obtaining a plant efficiency of the combined cycle power generation plant, based on the plant output and the fuel flow rate.

In this way, the performance of the power generation plant can be evaluated by using the plant efficiency (energy efficiency or heat rate).

According to a tenth aspect of the present disclosure, the performance evaluation method according to the ninth aspect may further include a step of obtaining an average efficiency for each section of the plant output, based on a relationship between the plant output and the plant efficiency.

In this way, it is possible to provide data that enables a user to easily understand a tendency of the plant efficiency (average heat rate) for each section of the plant output.

According to an eleventh aspect of the present disclosure, the performance evaluation method according to the tenth aspect may further include a step of comparing the average efficiency for each section of the plant output in a first operation mode of the combined cycle power generation plant and the average efficiency for each section of the plant output in a second operation mode different from the first operation mode with each other.

In this way, both performances of the two different operation modes can be compared with each other. Therefore, it is possible to provide data that enables a user to easily understand which operation mode is expected to improve the performance for each section of the plant output Pc.

According to a twelfth aspect of the present disclosure, in the performance evaluation method according to the eleventh aspect, the first operation mode may be an operation before a periodic inspection of the combined cycle power generation plant, and the second operation mode may be an operation after the periodic inspection.

In this way, it is possible to provide data which enables a user to easily understand whether or not the performance is improved by the periodic inspection.

According to a thirteenth aspect of the present disclosure, there is provided an operation control method of a combined cycle power generation plant. The operation control method includes a step of switching an operation mode to the second operation mode in a section where performance of the second operation mode is more satisfactory than performance of the first operation mode as a result of performing the performance evaluation method according to the eleventh aspect.

In this way, the power generation plant can be more efficiently operated.

According to a fourteenth aspect of the present disclosure, there is provided a performance evaluation device including an acquisition unit that acquires a sampling value of a gas turbine output and a sampling value of a steam turbine output which are measured at each time during an operation of a combined cycle power generation plant that generates power by using a gas turbine and a steam turbine, and an output calculation unit that obtains a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

According to a fifteenth aspect of the present disclosure, there is provided a program that causes a computer of a performance evaluation device to execute steps including a step of acquiring a sampling value of a gas turbine output and a sampling value of a steam turbine output which are measured at each time during an operation of a combined cycle power generation plant that generates power by using a gas turbine and a steam turbine, and a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time.

INDUSTRIAL APPLICABILITY

According to the performance evaluation method, the operation control method, the performance evaluation device, and the program in the present disclosure, plant performance can be evaluated, based on data measured during an operation.

REFERENCE SIGNS LIST

1: Performance evaluation system
10: Power generation plant (combined cycle power generation plant)
20: Performance evaluation device
201: Acquisition unit
202: Output calculation unit
203: Efficiency calculation unit
204: Comparison unit
205: Output processing unit
206: Memory
30: Data server
100: Gas turbine
110: Generator
120: Heat recovery steam generator
130: Steam turbine
140: Generator
150: Condenser
160: Control device
161: Operation control unit
162: Operation reception unit
163: Display unit
900: Computer
901: Processor

The invention claimed is:

1. A performance evaluation method comprising:
a step of acquiring a sampling value of a gas turbine output and a sampling value of a steam turbine output which are measured at each time during an operation of a combined cycle power generation plant that generates power by using a gas turbine and a steam turbine; and a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time, wherein in the step of obtaining the plant output, a fixed value of the delay time is obtained, based on a plurality of the sampling values of the gas turbine output and a plurality of the sampling values of the steam turbine output.

2. The performance evaluation method according to claim 1, wherein in the step of obtaining the plant output, a fixed value of the delay time is obtained, based on a maximum value of a cross-correlation function between the sampling value of the gas turbine output and the sampling value of the steam turbine output which are measured within a prescribed time period.

3. The performance evaluation method according to claim 1, wherein in the step of obtaining the plant output, based on the sampling value of the gas turbine output and the sampling value of the steam turbine output which are measured within a prescribed time period, the fixed value of the delay time is obtained by specifying a combination of a first extreme value of the gas turbine output and a second extreme value of the steam turbine output which is adjacent to the first extreme value in a time series at a time after the first extreme value, and by averaging a time difference between measurement times of the first extreme value and the second extreme value in each of a plurality of the specified combinations.

4. The performance evaluation method according to claim 3, wherein in the step of obtaining the plant output, the first extreme value and the second extreme value are at least one of a maximum value after the sampling value consecutively increases twice and a minimum value after the sampling value consecutively decreases twice.

5. The performance evaluation method according to claim 1, wherein in the step of obtaining the plant output, based on the acquired sampling value of the gas turbine output and the acquired sampling value of the steam turbine output, a time difference in each measurement time of a first extreme value of the gas turbine output and a second extreme value of the steam turbine output which is adjacent to the first extreme value in a time series at a time after the first extreme value is obtained, and the time difference is set as the fixed value of the delay time during a period from a measurement time of the first extreme value to a subsequent measurement time of the first extreme value.

6. The performance evaluation method according to claim 1, wherein in the step of obtaining the plant output, based on a maximum value of a cross-correlation function between the sampling value of the gas turbine output and the sampling value of the steam turbine output which are measured within a division period, which is a part of an evaluation period of the combined cycle power generation plant, the fixed value of the delay time in the division period is obtained.

7. The performance evaluation method according to claim 1, wherein in the step of obtaining the plant output, a cross-correlation function between the sampling value of the gas turbine output and the sampling value of the steam turbine output which are measured within a prescribed time period is obtained, the second time includes a plurality of times, and the plant output is obtained by summing up a weighted value for each time based on the cross-correlation function and the gas turbine output measured at the first time, with regard to each of the sampling values of the steam turbine output which are measured at each time included in the second time.

8. The performance evaluation method according to claim 1, further comprising:

a step of acquiring a sampling value of a fuel flow rate measured at each time during an operation of the combined cycle power generation plant; and a step of obtaining a plant efficiency of the combined cycle power generation plant, based on the plant output and the fuel flow rate.

9. The performance evaluation method according to claim 8, further comprising:

a step of obtaining an average efficiency for each section of the plant output, based on a relationship between the plant output and the plant efficiency.

10. The performance evaluation method according to claim 9, further comprising:

a step of comparing the average efficiency for each section of the plant output in a first operation mode of the combined cycle power generation plant and the average efficiency for each section of the plant output in a second operation mode different from the first operation mode with each other.

11. The performance evaluation method according to claim 10, wherein the first operation mode is an operation before a periodic inspection of the combined cycle power generation plant, and the second operation mode is an operation after the periodic inspection.

12. An operation control method of a combined cycle power generation plant, comprising:

a step of switching an operation mode to the second operation mode in a section where performance of the second operation mode is more satisfactory than performance of the first operation mode as a result of performing the performance evaluation method according to claim 10.

13. A performance evaluation device comprising:

an acquisition unit that acquires a sampling value of a gas turbine output and a sampling value of a steam turbine output which are measured at each time during an operation of a combined cycle power generation plant that generates power by using a gas turbine and a steam turbine; and an output calculation unit that obtains a plant output which is a total output of the sampling value of the gas turbine output measured at a first time and the sampling value of the steam turbine output corresponding to the gas turbine output measured at the first time, the steam turbine output being measured at a second time after a predetermined delay time from the first time, wherein the output calculation unit obtains a fixed value of the delay time based on a plurality of the sampling values of the gas turbine output and a plurality of the sampling values of the steam turbine output.

14. A non-transitory computer readable medium that stores instructions that cause a computer of a performance evaluation device to execute:
- a step of acquiring a sampling value of a gas turbine output and a sampling value of a steam turbine output which are measured at each time during an operation of a combined cycle power generation plant that generates power by using a gas turbine and a steam turbine; and
- a step of obtaining a plant output which is a total output of the sampling value of the gas turbine output measured at a first time and the sampling value of the steam turbine output corresponding to the gas turbine output measured at the first time, the steam turbine output being measured at a second time after a predetermined delay time from the first time,
- wherein in the step of obtaining the plant output, a fixed value of the delay time is obtained, based on a plurality of the sampling values of the gas turbine output and a plurality of the sampling values of the steam turbine output.

* * * * *